US011955092B2

(12) United States Patent
Kim et al.

(10) Patent No.: US 11,955,092 B2

(45) **Date of Patent: *Apr. 9, 2024**

(54) DISPLAY DEVICE, AND METHOD OF SENSING A DRIVING CHARACTERISTIC

(71) Applicants: Samsung Display Co., Ltd., Yongin-si (KR); SEOUL NATIONAL UNIVERSITY R&DB FOUNDATION, Seoul (KR)

(72) Inventors: Jeonkyoo Kim, Seoul (KR); Soo Yeon Lee, Seoul (KR); Manseung Cho, Seoul (KR); Kyeong Soo Kang, Seongnam-si (KR); Junhee Moon, Suwon-si (KR); Bonghyun You, Seoul (KR); Jin Kyu Lee, Seoul (KR)

(73) Assignees: SAMSUNG DISPLAY CO., LTD., Gyeonggi-Do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,152

(22) Filed: Apr. 15, 2023

(65) Prior Publication Data

US 2023/0252947 A1 Aug. 10, 2023

Related U.S. Application Data

(63) Continuation of application No. 17/874,680, filed on Jul. 27, 2022, now Pat. No. 11,631,374, which is a (Continued)

(30) Foreign Application Priority Data

Jul. 10, 2020 (KR) ........................ 10-2020-0085356

(51) Int. Cl.

*G09G 3/3291* (2016.01)
*G09G 3/3233* (2016.01)
*G09G 3/3266* (2016.01)

(52) U.S. Cl.

CPC ......... *G09G 3/3291* (2013.01); *G09G 3/3266* (2013.01); *G09G 2310/08* (2013.01)

(58) Field of Classification Search

CPC ............................................. G09G 2310/0251
See application file for complete search history.

(56) References Cited

U.S. PATENT DOCUMENTS

2008/0074413 A1* 3/2008 Ogura .................. G09G 3/3233 345/82
2008/0224621 A1* 9/2008 Uchino ................ G09G 3/3233 345/84

(Continued)

FOREIGN PATENT DOCUMENTS

KR 1020150017287 A 2/2015
KR 1020160007973 A 1/2016

(Continued)

*Primary Examiner* — Sepehr Azari
(74) *Attorney, Agent, or Firm* — CANTOR COLBURN LLP

(57) ABSTRACT

A display device includes a sensing circuit and a controller which selects a pixel row in a frame period. A vertical blank period of the frame period includes a sensing time in which the sensing circuit performs a sensing operation for the selected pixel row. The sensing circuit measures a first source voltage of a driving transistor of a pixel in the selected pixel row at a first time point of the sensing time, and measures a second source voltage of the driving transistor at a second time point of the sensing time. The controller calculates a threshold voltage parameter and a mobility parameter based on the first and second source voltages, predicts a saturated source voltage of the driving transistor based on the threshold voltage parameter and the (Continued)

mobility parameter, and calculates a threshold voltage of the driving transistor based on the saturated source voltage.

26 Claims, 15 Drawing Sheets

Related U.S. Application Data continuation of application No. 17/346,655, filed on Jun. 14, 2021, now Pat. No. 11,430,394.

(56) References Cited

U.S. PATENT DOCUMENTS

| | | | | |
|---|---|---|---|---|
| 2009/0309863 | A1* | 12/2009 | Seto | G09G 3/3233 345/82 |
| 2013/0162617 | A1* | 6/2013 | Yoon | G09G 3/3291 345/76 |
| 2014/0340436 | A1* | 11/2014 | Kumeta | G09G 3/3233 345/691 |
| 2015/0154908 | A1* | 6/2015 | Nam | G09G 3/3233 345/76 |
| 2015/0170578 | A1* | 6/2015 | Choi | G09G 3/3266 345/212 |
| 2015/0187271 | A1 | 7/2015 | Bae | H01L 27/1463 345/77 |
| 2016/0042690 | A1* | 2/2016 | Chang | G09G 3/3258 345/212 |
| 2016/0189623 | A1* | 6/2016 | Miwa | G09G 3/3233 345/212 |
| 2017/0004764 | A1* | 1/2017 | Kim | G09G 3/3233 |
| 2018/0053462 | A1* | 2/2018 | Bae | G09G 3/2074 |
| 2019/0156738 | A1* | 5/2019 | Ji | G09G 3/3225 |
| 2019/0189056 | A1* | 6/2019 | Gai | G09G 3/3233 |
| 2019/0385525 | A1 | 12/2019 | Jin | G09G 3/3208 |
| 2021/0104195 | A1 | 4/2021 | Choi | G09G 3/3233 |
| 2021/0225289 | A1* | 7/2021 | Wang | G09G 3/3291 |
| 2021/0407437 | A1* | 12/2021 | Jang | G09G 3/3291 |

FOREIGN PATENT DOCUMENTS

| | | | |
|---|---|---|---|
| KR | 1020170006350 | A | 1/2017 |
| KR | 1020170064179 | A | 6/2017 |
| KR | 1020170080364 | A | 7/2017 |

* cited by examiner

FIG. 7

310:
$$I_{ds}(t)=\frac{1}{2}\mu_n C_{ox}\frac{W}{L}\cdot(V_{gs}(t)-V_{th})^2$$

$$V_{eff}(t)=V_{gs}(t)-V_{th}\ \&\ k=\frac{1}{2}\mu_n C_{ox}\frac{W}{L}$$

320:
$$I_{ds}(t)=k\cdot V_{eff}(t)^2$$

330:
$$Q=C_{line}\cdot V_s$$

340:
$$\frac{dQ}{dt}=C_{line}\cdot\frac{dV_s(t)}{dt}=-C_{line}\cdot\frac{dV_{eff}(t)}{dt}$$

350:
$$k\cdot V_{eff}(t)^2=-C_{line}\cdot\frac{dV_{eff}(t)}{dt}$$

360:
$$V_{eff}(t)=\frac{1}{\frac{1}{V_g-V_s(0)-V_{th}}+\frac{k}{C_{line}}t}$$

365:
$$V_{eff}(t)=V_g-V_s(t)-V_{th}=\frac{1}{\frac{1}{V_g-V_s(0)-V_{th}}+\frac{k}{C_{line}}t}$$

370:
$$V_{th}=V_g-\left(\frac{2\gamma}{-\beta\gamma+\sqrt{\beta^2\gamma^2+4\beta\gamma}}+V_s(0)\right)$$

SVs (dashed box)

$$\left(\beta=\frac{k}{C_{line}}t,\ \gamma=V_s(t)-V_s(0)\right)$$

$$V_s(0)=0V$$

380:
$$SV_s=\frac{2\gamma}{-\beta\gamma+\sqrt{\beta^2\gamma^2+4\beta\gamma}}$$

390:
$$SV_s=\frac{\gamma}{2}+\sqrt{\frac{\gamma^2}{4}+\frac{\gamma}{\beta}}$$

$$\left(\beta=\frac{k}{C_{line}}t,\ \gamma=V_s(t)\right)$$

FIG. 9

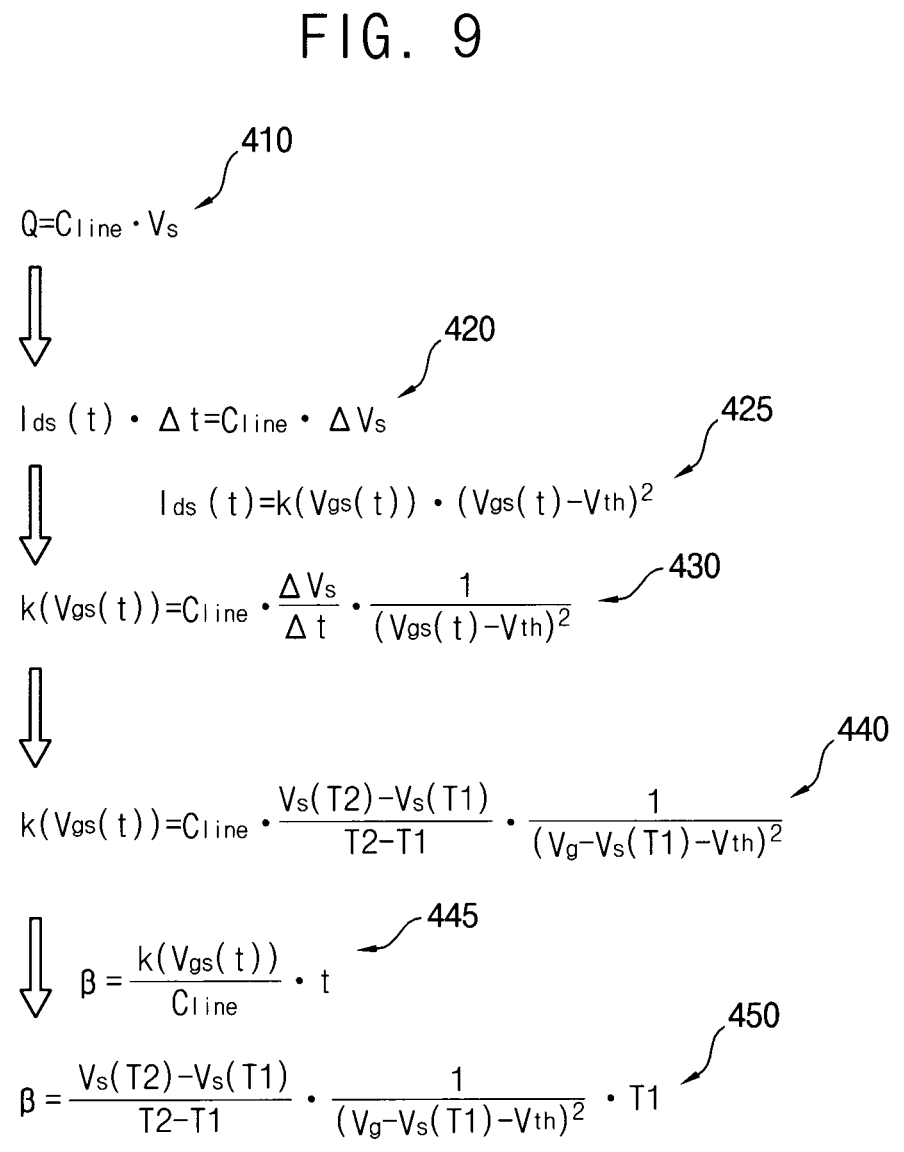

410

$$Q = C_{line} \cdot V_s$$

↓

420

$$I_{ds}(t) \cdot \Delta t = C_{line} \cdot \Delta V_s$$

↓

425

$$I_{ds}(t) = k(V_{gs}(t)) \cdot (V_{gs}(t) - V_{th})^2$$

430

$$k(V_{gs}(t)) = C_{line} \cdot \frac{\Delta V_s}{\Delta t} \cdot \frac{1}{(V_{gs}(t) - V_{th})^2}$$

↓

440

$$k(V_{gs}(t)) = C_{line} \cdot \frac{V_s(T2) - V_s(T1)}{T2 - T1} \cdot \frac{1}{(V_g - V_s(T1) - V_{th})^2}$$

↓

445

$$\beta = \frac{k(V_{gs}(t))}{C_{line}} \cdot t$$

450

$$\beta = \frac{V_s(T2) - V_s(T1)}{T2 - T1} \cdot \frac{1}{(V_g - V_s(T1) - V_{th})^2} \cdot T1$$

610

| Degradation Degree | 1 | 2 | 3 |
|---|---|---|---|
| Vth | - | +0.4V | +0.8V |
| μ | - | -9.11% | -18.15% |

FIG. 14

$$k(V_{gs}(t)) = C_{line} \cdot \frac{\Delta V_s}{\Delta t} \cdot \frac{1}{(V_{gs}(t) - V_{th})^2}$$ 810

⇓

$$k(V_{gs}(t)) = C_{line} \cdot \frac{V_s(T2) - V_s(T1)}{T2 - T1} \cdot \frac{1}{(V_{gs}(T1) - V_{th})^2}$$ 820

⇓

$$\beta = \frac{k(V_{gs}(t))}{C_{line}} \cdot t$$ 830

$$\beta = \frac{V_s(T2) - V_s(T1)}{T2 - T1} \cdot \frac{1}{(V_{gs}(T1) - V_{th})^2} \cdot T1$$ 840

DISPLAY DEVICE, AND METHOD OF SENSING A DRIVING CHARACTERISTIC

This application is a continuation of U.S. patent application Ser. No. 17/874,680, filed on Jul. 27, 2022, which is a continuation of U.S. patent application Ser. No. 17/346,655, filed on Jun. 14, 2021, which claims priority to Korean Patent Application No. 10-2020-0085356, filed on Jul. 10, 2020, and all the benefits accruing therefrom under 35 U.S.C. § 119, the content of which in its entirety is herein incorporated by reference.

BACKGROUND

1. Field

Embodiments of the invention relate to a display device, and more particularly to a display device performing a sensing operation, and a method of sensing a driving characteristic.

2. Description of the Related Art

Even when a plurality of pixels included in a display device, such as an organic light emitting diode ("OLED") display device, is manufactured by the same process, driving transistors of the plurality of pixels may have different driving characteristics from each other due to a process variation, or the like. Thus, the plurality of pixels may emit light with different luminance. Further, as the OLED display device operates over time, the plurality of pixels may be degraded, and the driving characteristics of the driving transistors may be degraded. To compensate for initial non-uniformity of luminance and for the degradation, the OLED display device may perform a sensing operation that senses the driving characteristics of the driving transistors of the plurality of pixels.

SUMMARY

To accurately sense driving characteristics of driving transistors of a plurality of pixels, a sufficient sensing time (e.g., tens of milliseconds) is desired to saturate source voltages of the driving transistors. Accordingly, a sensing operation cannot be performed in real time while a display device (e.g., an organic light emitting diode ("OLED") display device) displays an image.

Some embodiments provide a display device capable of performing a sensing operation that a driving characteristic of a driving transistor in real time.

Some embodiments provide a method of sensing a driving characteristic of a driving transistor in real time.

An embodiment provides a display device including a display panel including a plurality of pixel rows, a scan driver which provides a scan signal and a sensing signal to a corresponding pixel row of the plurality of pixel rows, a data driver coupled to the plurality of pixel rows through a plurality of data lines, a sensing circuit coupled to the plurality of pixel rows through a plurality of sensing lines, and a controller which controls the scan driver, the data driver and the sensing circuit, and selects a pixel row from the plurality of pixel rows in a frame period. A vertical blank period of the frame period includes a sensing time in which the sensing circuit performs a sensing operation for the selected pixel row. The sensing circuit measures a first source voltage of a driving transistor of a pixel in the selected pixel row at a first time point of the sensing time, and measures a second source voltage of the driving transistor at a second time point of the sensing time. The controller calculates a threshold voltage parameter and a mobility parameter based on the first source voltage and the second source voltage, predicts a saturated source voltage of the driving transistor based on the threshold voltage parameter and the mobility parameter, and calculates a threshold voltage of the driving transistor based on the saturated source voltage.

In an embodiment, the pixel may include the driving transistor including a gate, a drain receiving a first power supply voltage, and a source, a first switching transistor including a gate receiving the scan signal, a drain coupled to one of the plurality of data lines, and a source coupled to the gate of the driving transistor, a second switching transistor including a gate receiving the sensing signal, a drain coupled to the source of the driving transistor, and a source coupled to one of the plurality of sensing lines, a storage capacitor including a first electrode coupled to the gate of the driving transistor, and a second electrode coupled to the source of the driving transistor, and a emitting element including an anode coupled to the source of the driving transistor, and a cathode receiving a second power supply voltage.

In an embodiment, the threshold voltage parameter may be calculated by subtracting a reference voltage from the first source voltage.

In an embodiment, a gate voltage of the driving transistor may be fixed to a sensing data voltage from a start time point of the sensing time to the second time point.

In an embodiment, the data driver may apply a sensing data voltage to the plurality of data lines during the sensing time, the scan driver may apply the scan signal to the selected pixel row during the sensing time, the sensing circuit may apply a reference voltage to the plurality of sensing lines from a start time point of the sensing time to a third time point before the first time point, and the scan driver may apply the sensing signal to the selected pixel row from the third time point to an end time point of the sensing time.

In an embodiment, the mobility parameter may be calculated by an equation:

$$\beta = \frac{Vs(T2) - Vs(T1)}{T2 - T1} \cdot \frac{1}{(Vg - Vs(T1) - Vth)^2} \cdot T1,$$

where β represents the mobility parameter, T1 represents the first time point, T2 represents the second time point, Vs(T1) represents the first source voltage, Vs(T2) represents the second source voltage, Vg represents a sensing data voltage, and Vth represents the threshold voltage of the driving transistor obtained by a previous sensing operation.

In an embodiment, the saturated source voltage may be predicted by an equation:

$$SVs = \frac{\gamma}{2} + \sqrt{\frac{\gamma^2}{4} + \frac{\gamma}{\beta}},$$

where SVs represents the saturated source voltage, γ represents the threshold voltage parameter, and β represents the mobility parameter.

In an embodiment, the threshold voltage of the driving transistor may be calculated by subtracting the saturated source voltage from a sensing data voltage.

In an embodiment, a time from a start time point of the sensing time to the first time point may be about 200 microseconds (μs), and a time from the first time point to the second time point may be about 10 μs.

In an embodiment, a gate voltage of the driving transistor may be fixed to a sensing data voltage from a start time point of the sensing time to the first time point, and may be floated from the first time point to the second time point. A gate-source voltage of the driving transistor may be fixed from the first time point to the second time point.

In an embodiment, the data driver may apply a sensing data voltage to the plurality of data lines from a start time point of the sensing time to the first time point, the scan driver may apply the scan signal to the selected pixel row from the start time point of the sensing time to the first time point, the sensing circuit may apply a reference voltage to the plurality of sensing lines from the start time point of the sensing time to a third time point before the first time point, and the scan driver may apply the sensing signal to the selected pixel row from the third time point to the second time point.

In an embodiment, the mobility parameter may be calculated by an equation:

$$\beta = \frac{Vs(T2) - Vs(T1)}{T2 - T1} \cdot \frac{1}{(Vgs(T1) - Vth)^2} \cdot T1,$$

where β represents the mobility parameter, T1 represents the first time point, T2 represents the second time point, Vs(T1) represents the first source voltage, Vs(T2) represents the second source voltage, Vgs(T1) represents a gate-source voltage of the driving transistor at the first time point, and Vth represents the threshold voltage of the driving transistor obtained by a previous sensing operation.

In an embodiment, the vertical blank period may include, after the sensing time, a previous data writing time in which a previous data voltage applied to the pixel in an active period before the vertical blank period is applied again to the pixel.

In an embodiment, the display device may further include a characteristic parameter memory which stores the threshold voltage of the driving transistor and the mobility parameter. The controller may correct input image data for the pixel based on the threshold voltage and the mobility parameter stored in the characteristic parameter memory.

An embodiment provides a method of sensing a driving characteristic in a display device including a plurality of pixel rows. In the method, a pixel row is selected from the plurality of pixel rows in a frame period, a first source voltage of a driving transistor of a pixel in the selected pixel row is measured at a first time point of a sensing time within a vertical blank period of the frame period, a second source voltage of the driving transistor is measured at a second time point of the sensing time, a threshold voltage parameter is calculated based on the first source voltage, a mobility parameter is calculated based on the first source voltage and the second source voltage, a saturated source voltage of the driving transistor is predicted based on the threshold voltage parameter and the mobility parameter, and a threshold voltage of the driving transistor is calculated based on the saturated source voltage.

In an embodiment, a gate voltage of the driving transistor may be fixed to a sensing data voltage from a start time point of the sensing time to the second time point.

In an embodiment, the mobility parameter may be calculated by an equation:

$$\beta = \frac{Vs(T2) - Vs(T1)}{T2 - T1} \cdot \frac{1}{(Vg - Vs(T1) - Vth)^2} \cdot T1,$$

where β represents the mobility parameter, T1 represents the first time point, T2 represents the second time point, Vs(T1) represents the first source voltage, Vs(T2) represents the second source voltage, Vg represents a sensing data voltage, and Vth represents the threshold voltage of the driving transistor obtained by a previous sensing operation.

In an embodiment, the saturated source voltage may be predicted by an equation:

$$SVs = \frac{\gamma}{2} + \sqrt{\frac{\gamma^2}{4} + \frac{\gamma}{\beta}},$$

where SVs represents the saturated source voltage, γ represents the threshold voltage parameter, and β represents the mobility parameter.

In an embodiment, a gate voltage of the driving transistor may be fixed to a sensing data voltage from a start time point of the sensing time to the first time point, and may be floated from the first time point to the second time point. A gate-source voltage of the driving transistor may be fixed from the first time point to the second time point.

In an embodiment, the mobility parameter may be calculated by an equation:

$$\beta = \frac{Vs(T2) - Vs(T1)}{T2 - T1} \cdot \frac{1}{(Vgs(T1) - Vth)^2} \cdot T1,$$

where β represents the mobility parameter, T1 represents the first time point, T2 represents the second time point, Vs(T1) represents the first source voltage, Vs(T2) represents the second source voltage, Vgs(T1) represents a gate-source voltage of the driving transistor at the first time point, and Vth represents the threshold voltage of the driving transistor obtained by a previous sensing operation.

As described above, in a display device (e.g., an OLED display device) and a method of sensing a driving characteristic in embodiments, first and second source voltages of a driving transistor of each pixel in a selected pixel row may be measured at first and second time points of a sensing time within a vertical blank period, a threshold voltage parameter and a mobility parameter may be calculated based on the first and second source voltages, a saturated source voltage of the driving transistor may be predicted based on the threshold voltage parameter and the mobility parameter, and a threshold voltage of the driving transistor may be calculated based on the saturated source voltage. Accordingly, since the saturated source voltage of the driving transistor after saturation is predicted by the first and second source voltages of the driving transistor before saturation, a sensing operation that senses the driving characteristic (e.g., the threshold voltage and/or mobility) of the driving transistor may be accurately and efficiently performed.

BRIEF DESCRIPTION OF THE DRAWINGS

Illustrative, non-limiting embodiments will be more clearly understood from the following detailed description in conjunction with the accompanying drawings.

FIG. 7 is a diagram for describing an embodiment of equations used to predict a saturated source voltage in a method of sensing a driving characteristic.

FIG. 9 is a diagram for describing an embodiment of equations used to calculate a mobility parameter in a method of sensing a driving characteristic.

FIG. 14 is a diagram for describing an embodiment of equations used to calculate a mobility parameter in a method of sensing a driving characteristic.

DETAILED DESCRIPTION

Figure 1:
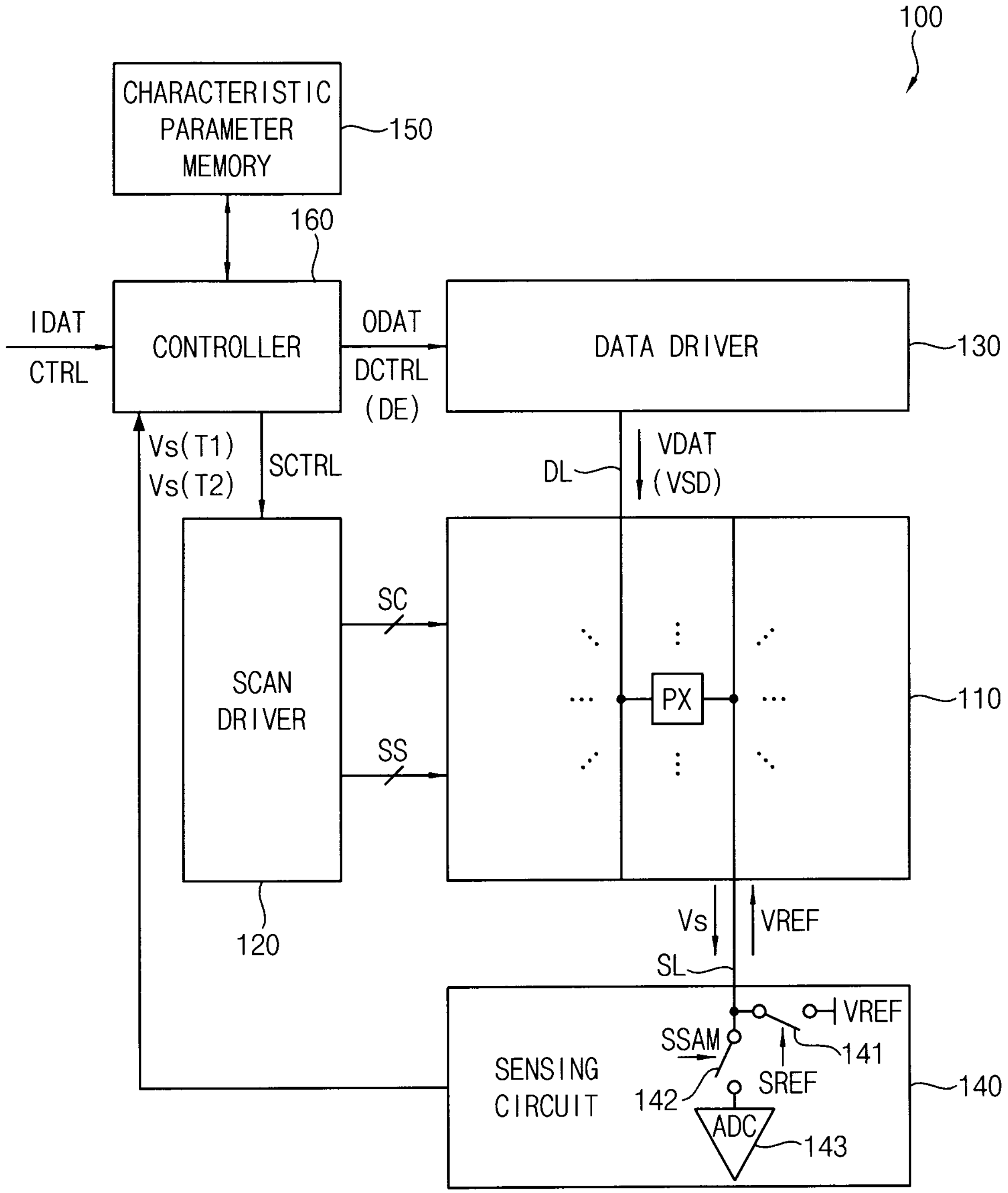
FIG. 1 is a block diagram illustrating a display device.

Hereinafter, embodiments of the invention will be explained in detail with reference to the accompanying drawings.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 2:
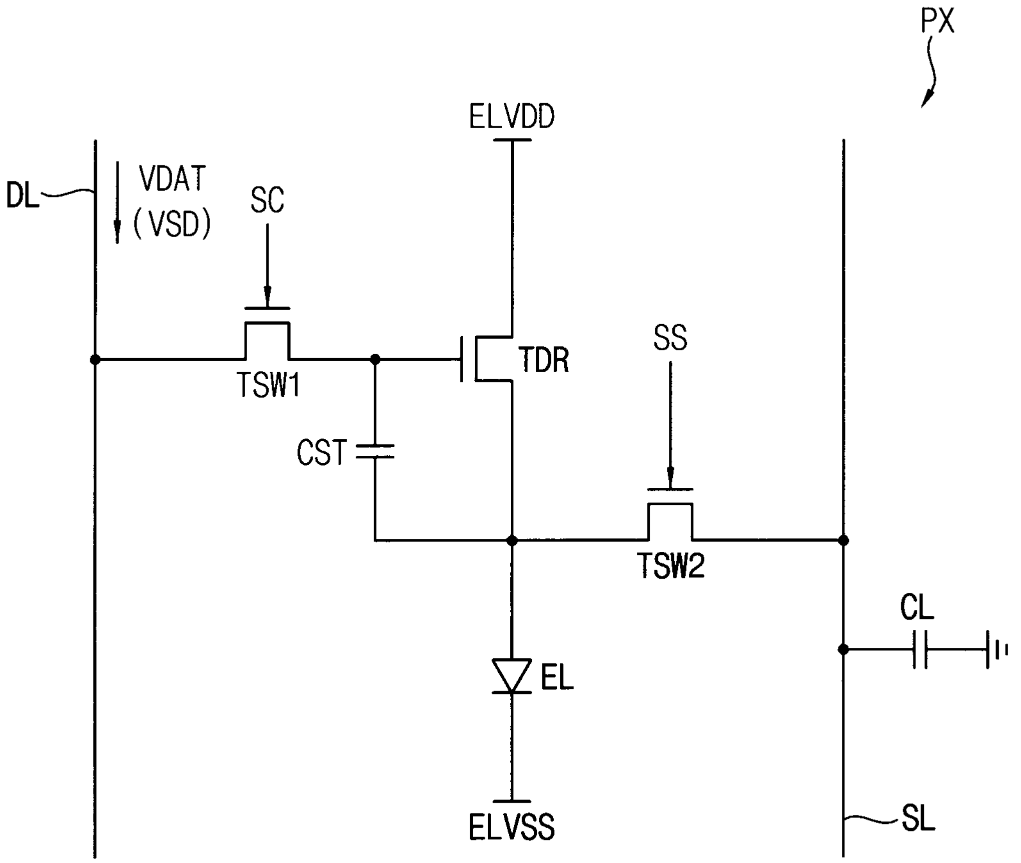
FIG. 2 is a circuit diagram illustrating an embodiment of a pixel included in a display device.
Figure 3:
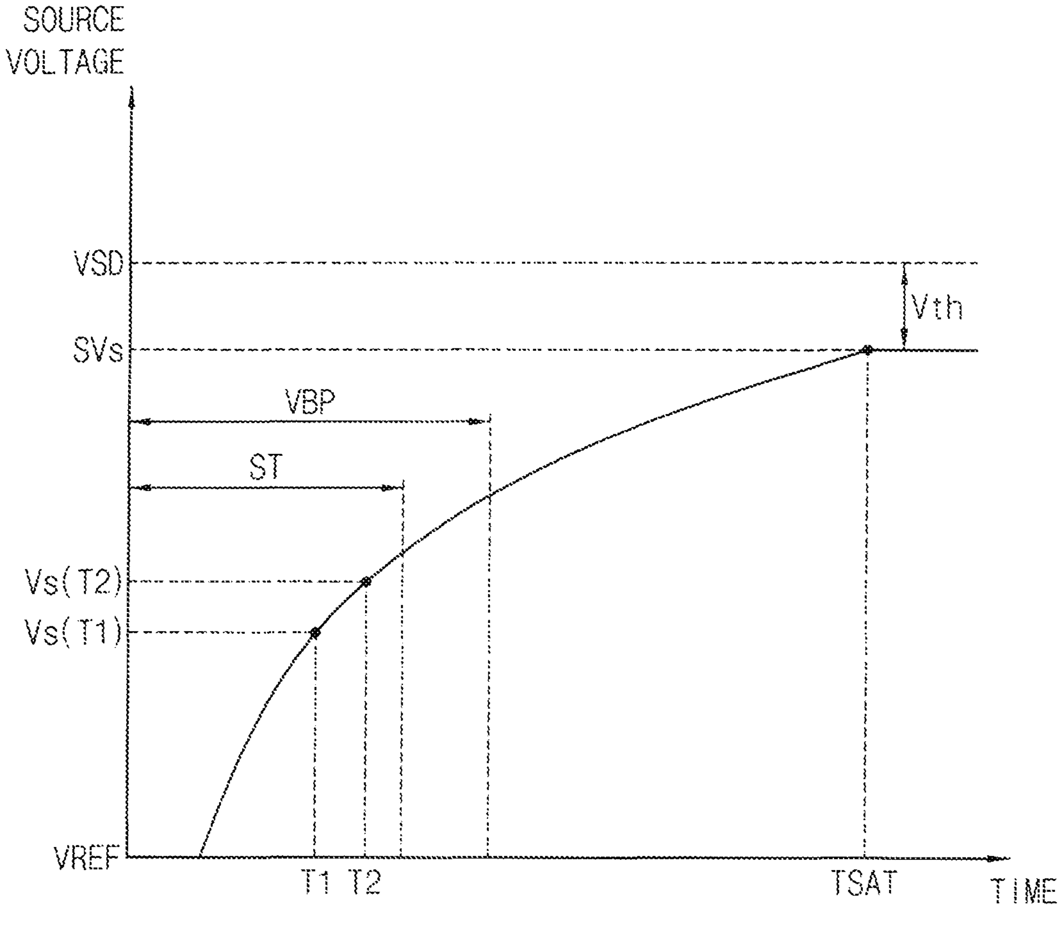
FIG. 3 is a diagram illustrating an embodiment of a source voltage over time for describing a sensing operation of a display device.

FIG. 1 is a block diagram illustrating an embodiment of a display device, FIG. 2 is a circuit diagram illustrating an embodiment of a pixel included in an OLED display device, and FIG. 3 is a diagram illustrating an embodiment of a source voltage over time for describing a sensing operation of an OLED display device.

Referring to FIG. 1, a display device 100 (e.g., an organic light emitting diode ("OLED") display device) in embodiments may include a display panel 110 that includes a plurality of pixel rows, a scan driver 120 that provides a scan signal SC and a sensing signal SS to a corresponding pixel row of the plurality of pixel rows, a data driver 130 that is coupled to the plurality of pixel rows through a plurality of data lines DL, a sensing circuit 140 that is coupled to the plurality of pixel rows through a plurality of sensing lines SL, and a controller 160 that controls the scan driver 120, the data driver 130 and the sensing circuit 140. In some embodiments, the display device 100 may further include a characteristic parameter memory 150 that stores a driving characteristic parameter of a driving transistor of each pixel PX.

The display panel 110 may include the plurality of data lines DL, the plurality of sensing lines SL, and the plurality of pixel rows coupled to the plurality of data lines DL and the plurality of sensing lines SL. Here, each pixel row may be a row of pixels PX, and the pixels PX in the same pixel row may receive the same scan signal SC and the same sensing signal SS. The display panel 110 may further include a plurality of scan signal lines respectively coupled to the plurality of pixel rows, and a plurality of sensing signal lines respectively coupled to the plurality of pixel rows. In some embodiments, each pixel PX may include an OLED, and the display panel 110 may be an OLED display panel. In other embodiments, each pixel PX may include any suitable light emitting element, such as a quantum dot (QD) light emitting element, or the like.

In an embodiment, as illustrated in FIGS. 2, each pixel PX may include the driving transistor TDR, a first switching transistor TSW1, a second switching transistor TSW2, a storage capacitor CST and a light emitting element EL, for example.

The storage capacitor CST may store a data voltage VDAT (or a sensing data voltage VSD) transferred through the data line DL and/or the sensing line SL. In some embodiments, the storage capacitor CST may include a first electrode coupled to a gate of the driving transistor TDR, and a second electrode coupled to a source of the driving transistor.

The first switching transistor TSW1 may couple the data line DL to the first electrode of the storage capacitor CST in response to the scan signal SC. Thus, the first switching transistor TSW1 may transfer the data voltage VDAT (or the sensing data voltage VSD) of the data line DL to the first electrode of the storage capacitor CST in response to the scan signal SC. In some embodiments, the first switching transistor TSW1 may include a gate receiving the scan signal SC, a drain coupled to the data line DL, and a source coupled to the first electrode of the storage capacitor CST and the gate of the driving transistor TDR.

The second switching transistor TSW2 may couple the sensing line SL to the second electrode of the storage capacitor CST and a source of the driving transistor TDR in response to the sensing signal SS. In some embodiments, the second switching transistor TSW2 may include a gate receiving the sensing signal SS, a drain coupled to the source coupled to the driving transistor TDR, and a source coupled to the sensing line SL. The sensing line SL may be coupled to a line capacitor CL. In some embodiments, the line capacitor CL may be, but not be limited to, a parasitic capacitor of the sensing line SL.

The driving transistor TDR may generate a driving current based on the data voltage VDAT stored in the storage capacitor CST. In some embodiments, the driving transistor TDR may include the gate coupled to the first electrode of the storage capacitor CST, a drain receiving a first power supply voltage ELVDD (e.g., a high power supply voltage), and a source coupled to the second electrode of the storage capacitor CST and the drain of the second switching transistor TSW2.

The light emitting element EL may emit light in response to the driving current generated by the driving transistor TDR. In some embodiments, the light emitting element EL may include an anode coupled to the source of the driving transistor TDR, and a cathode receiving a second power supply voltage ELVSS (e.g., a low power supply voltage).

Although FIG. 2 illustrates an embodiment of the pixel PX, the pixel PX of the display device 100 is not limited to the embodiment of FIG. 2.

The scan driver 120 may generate the scan signals SC and the sensing signals SS based on a scan control signal SCTRL from the controller 160, and may sequentially provide the scan signals SC and the sensing signals SS to the plurality of pixels PX on a pixel row basis in an active period of each frame period. In some embodiments, the scan control signal SCTRL may include, but not limited to, a start signal and a clock signal. In some embodiments, the scan driver 120 may be integrated or discretely provided in a peripheral portion of the display panel 110. In other embodiments, the scan driver 120 may be implemented with one or more integrated circuits ("ICs").

The data driver 130 may generate the data voltages VDAT based on output image data ODAT and a data control signal DCTRL received from the controller 160, and may provide the data voltages VDAT to the plurality of pixels PX in the active period of each frame period. In some embodiments, the data driver 130 may provide the sensing data voltage VSD to the pixels PX in a selected pixel row in a vertical blank period of each frame period. The data control signal DCTRL may include a data enable signal DE (refer to FIGS. 5 and 6) that periodically transitions to inform the data driver 130 of a transfer timing of the output image data ODAT in the active period and has a low level in the vertical blank period. In some embodiments, the data control signal DCTRL may further include, but not limited to, a horizontal start signal and a load signal. In some embodiments, the data driver 130 and the controller 160 may be implemented with at least one single IC, and the single IC may be referred to as a timing controller embedded data driver ("TED") IC. In other embodiments, the data driver 130 and the controller 160 may be implemented with separate ICs.

The sensing circuit 140 may provide a reference voltage VREF to the selected pixel row on which a sensing operation is performed through the plurality of sensing lines SL, and may receive source voltages Vs of the driving transistor TDR of the pixels PX in the selected pixel row through the plurality of sensing lines SL. In some embodiments, the sensing circuit 140 may include a first switch 141 that provides the reference voltage VREF to the sensing line SL in response to a reference signal SREF, a second switch 142 that couples the sensing line SL to an analog-to-digital converter ("ADC") 143 in response to a sampling signal SSAM, and the ADC 143 that converts the source voltage Vs received through the sensing line SL into a digital signal. In some embodiments, the sensing circuit 140 may include one ADC 143 per one sensing line SL. In other embodiments, the sensing circuit 140 may include one ADC 143 per a plurality of sensing lines SL, for example four, eight or sixteen sensing lines SL, and the ADC 143 may perform an analog-to-digital conversion operation on the source voltages Vs of the plurality of sensing lines SL in a time-divisional manner. In some embodiments, the sensing circuit 140 may be implemented with a separate IC from an IC of the data driver 130. In other embodiments, the sensing circuit 140 may be included in the data driver 130, or may be included in the controller 160.

The characteristic parameter memory 150 may store the driving characteristic parameter of the driving transistor TDR of each pixel PX. In some embodiments, the sensing circuit 140 may measure first and second source voltages Vs(T1) and Vs(T2) at first and second time points of a sensing time by performing the sensing operation on the selected pixel row during the sensing time within each vertical blank period, the controller 160 may calculate a threshold voltage parameter and a mobility parameter of the driving transistor TDR based on the first and second source voltages Vs(T1) and Vs(T2), and the characteristic parameter memory 150 may store the threshold voltage parameter and the mobility parameter of the driving transistor TDR. In other embodiments, the controller 160 may predict a saturated source voltage of the driving transistor TDR based on the threshold voltage parameter and the mobility parameter, and may calculate a threshold voltage of the driving transistor TDR based on the predicted saturated source voltage, and the characteristic parameter memory 150 may store the threshold voltage and the mobility parameter of the driving transistor TDR.

The controller 160 (e.g., a timing controller ("TCON")) may receive input image data IDAT and a control signal CTRL from an external host processor (e.g., a graphic processing unit ("GPU"), an application processor ("AP") or a graphic card). In some embodiments, the control signal CTRL may include, but not limited to, a vertical synchronization signal, a horizontal synchronization signal, an input data enable signal, a master clock signal, etc. The controller 160 may generate the output image data ODAT, the data control signal DCTRL and the scan control signal SCTRL based on the driving characteristic parameter stored in the characteristic parameter memory 150, the input image data IDAT and the control signal CTRL. In some embodiments, the characteristic parameter memory 150 may store the threshold voltage and the mobility parameter of the driving transistor TDR, and the controller 160 may generate the output image data ODAT by correcting the input image data IDAT based on the threshold voltage and the mobility parameter of the driving transistor TDR stored in the characteristic parameter memory 150. In an embodiment, the controller 160 may generate the output image data ODAT representing the data voltage VDAT where the threshold voltage stored in the characteristic parameter memory 150 is added to a voltage corresponding to the input image data IDAT, for example. Further, for example, the controller 160 may generate the output image data ODAT such that the data voltage VDAT decreases as the mobility parameter increases, and increases as the mobility parameter decreases. The controller 160 may control an operation of the scan driver 120 by providing the scan control signal SCTRL to the scan driver 120, and may control an operation of the data driver 130 by providing the output image data ODAT and the data control signal DCTRL to the data driver 130.

In embodiments of the display device 100, the controller 160 may select a pixel row on which the sensing operation is to be performed from the plurality of pixel rows of the display panel 110 in each frame period. In some embodiments, the controller 160 may sequentially select the plurality of pixel rows in a plurality of frame periods such that the pixel row on which the sensing operation is to be performed is changed per frame period. In other embodiments, the controller 160 may randomly select a pixel row on which the sensing operation is to be performed from the plurality of pixel rows of the display panel 110 in each frame period.

The vertical blank period of each frame period may include the sensing time in which the sensing circuit 140 performs the sensing operation on the selected pixel row. Thus, the sensing circuit 140 may perform the sensing operation on the selected pixel row during the sensing time within the vertical blank period. To perform the sensing operation, at a start time point of the sensing time, the sensing data voltage VSD may be applied to the gate of the driving transistor TDR of each pixel PX in the selected pixel row through the data line DL and the first switching transistor TSW1, and the reference voltage VREF may be applied to the sensing line SL. Thereafter, when the second switching transistor TSW2 is turned on in response to the sensing signal SS, the source of the driving transistor TDR may be coupled to the sensing line SL. In this case, as illustrated in FIG. 3, the source voltage Vs of the driving transistor TDR may be gradually increased from the reference voltage VREF, and may be saturated to the saturated source voltage SVs corresponding to a voltage where the threshold voltage Vth of the driving transistor TDR is subtracted from the sensing data voltage VSD. In a conventional display device, to sense the threshold voltage Vth of the driving transistor TDR, the source voltage Vs of the driving transistor TDR may be measured after the source voltage Vs of the driving transistor TDR is saturated to the saturated source voltage SVs. However, a saturated time point TSAT at which the source voltage Vs of the driving transistor TDR is saturated to the saturated source voltage SVs may be later than an end time point of the vertical blank period VBP of each frame period, and thus the sensing operation of the conventional display device may not be performed within the vertical blank period VBP. Thus, the conventional display device cannot perform the sensing operation in real time while displaying an image.

However, in embodiments of the display device 100, the sensing circuit 140 may measure the first source voltage Vs(T1) of the driving transistor TDR of each pixel PX in the selected pixel row at the first time point T1 of the sensing time ST within the vertical blank period VBP, and may measure the second source voltage Vs(T2) of the driving transistor TDR at the second time point T2 of the sensing time ST within the vertical blank period VBP. The controller 160 may receive the first source voltage Vs(T1) and the second source voltage Vs(T2) from the sensing circuit 140, may calculate the threshold voltage parameter and the mobility parameter based on the first source voltage Vs(T1) and the second source voltage Vs(T2), may predict the saturated source voltage SVs of the driving transistor TDR based on the threshold voltage parameter and the mobility parameter, and may calculate the threshold voltage Vth of the driving transistor TDR based on the saturated source voltage SVs. Accordingly, in embodiments of the display device 100, since the sensing circuit 140 measures the first and second source voltages Vs(T1) and Vs(T2) respectively at the first and second time points T1 and T2 before the saturated time point TSAT, and predicts the saturated source voltage SVs based on the first and second source voltages Vs(T1) and Vs(T2), the sensing operation by the sensing circuit 140 may be performed within the vertical blank period VBP, and be performed in real time while the display device 100 displays an image.

As described above, in embodiments of the display device 100, the first and second source voltages Vs(T1) and Vs(T2) of the driving transistor TDR of each pixel PX in the selected pixel row may be measured respectively at the first and second time points T1 and T2 of the sensing time ST within the vertical blank period VBP, the threshold voltage parameter and the mobility parameter may be calculated based on the first and second source voltages Vs(T1) and Vs(T2), the saturated source voltage SVs of the driving transistor TDR may be predicted based on the threshold voltage parameter and the mobility parameter, and the threshold voltage Vth of the driving transistor TDR may be calculated based on the saturated source voltage SVs. Accordingly, since the saturated source voltage SVs of the driving transistor TDR after saturation is predicted by the first and second source voltages Vs(T1) and Vs(T2) of the driving transistor TDR before saturation, the sensing operation that senses the driving characteristic (e.g., the threshold voltage Vth and/or mobility) of the driving transistor TDR may be accurately and efficiently performed in real time.

Figure 4:
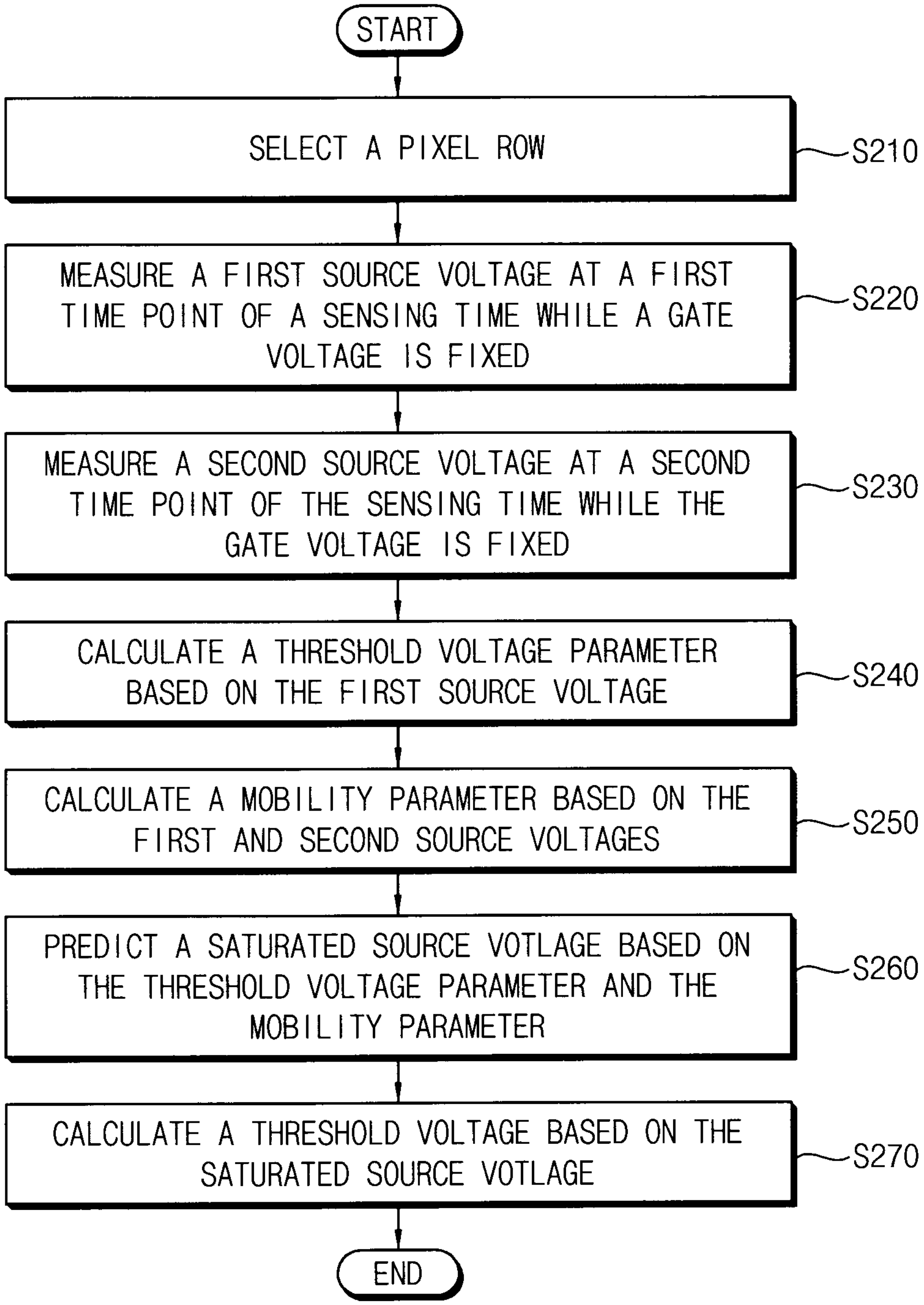
FIG. 4 is a flowchart illustrating a method of sensing a driving characteristic in a display device.
Figure 5:
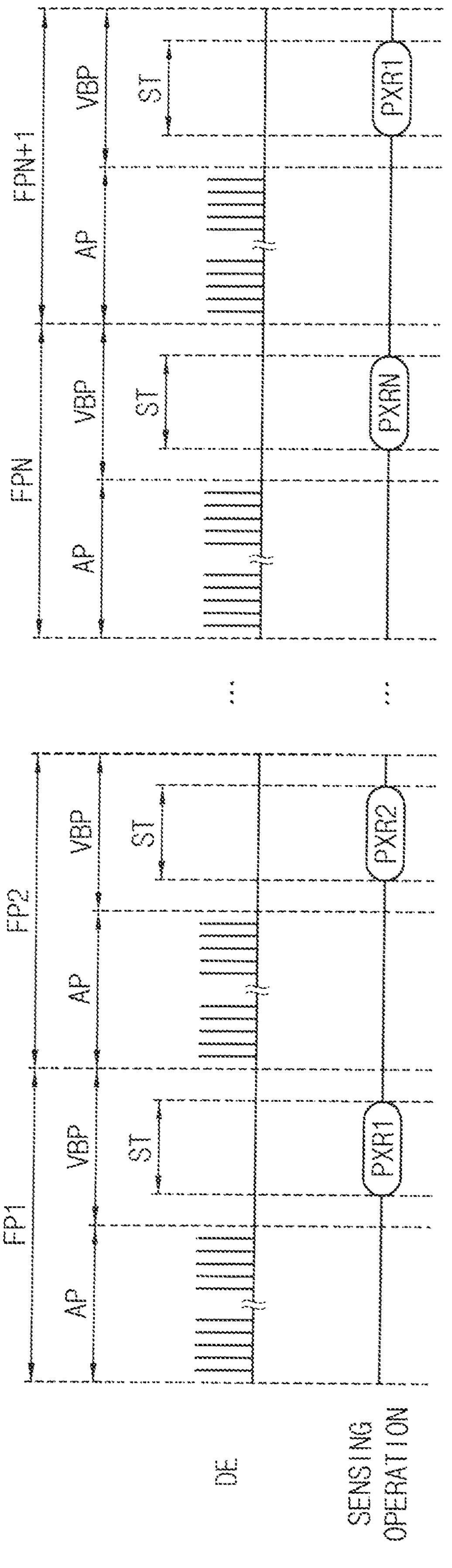
FIG. 5 is a diagram for describing an example where a pixel row on which a sensing operation is to be performed is selected in each frame period.
Figure 6:
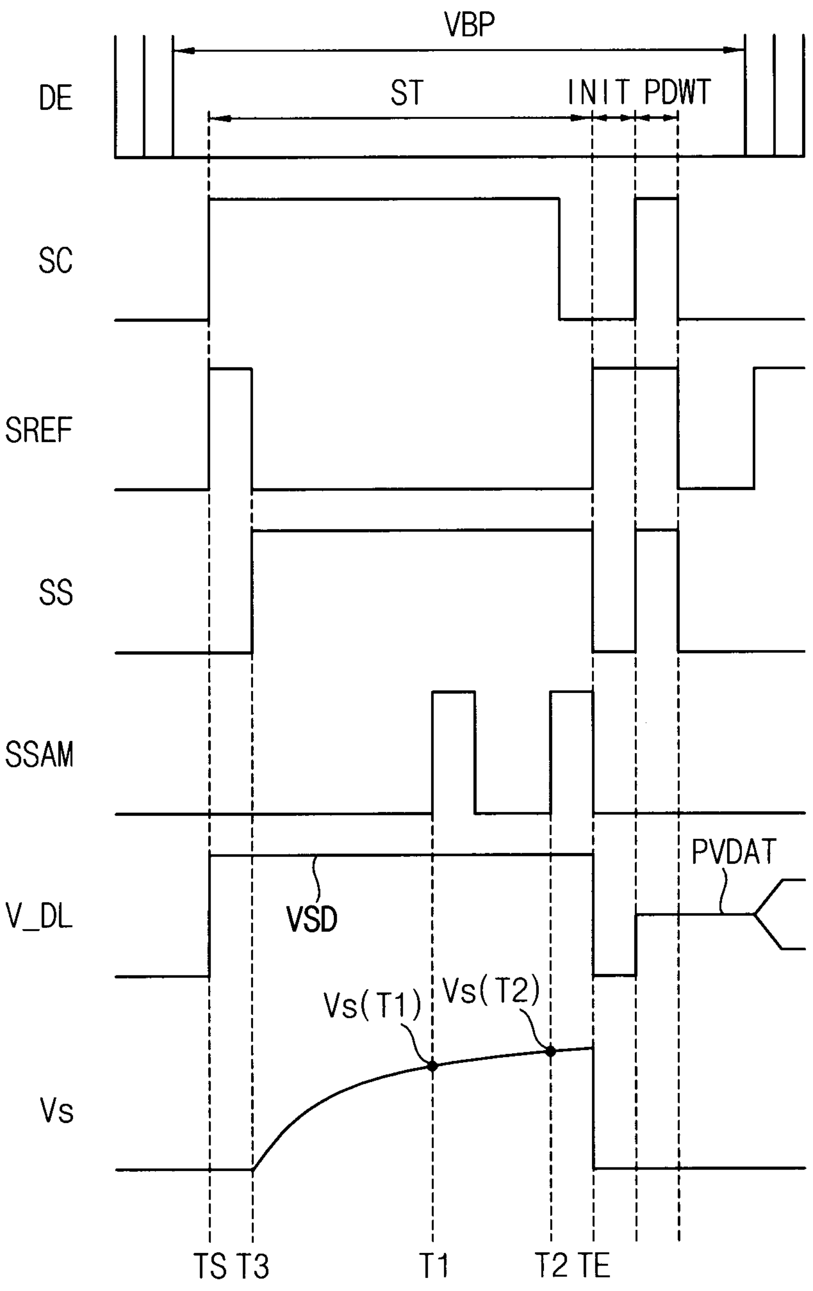
FIG. 6 is a timing diagram for describing an embodiment of an operation of a display device.
Figure 8:
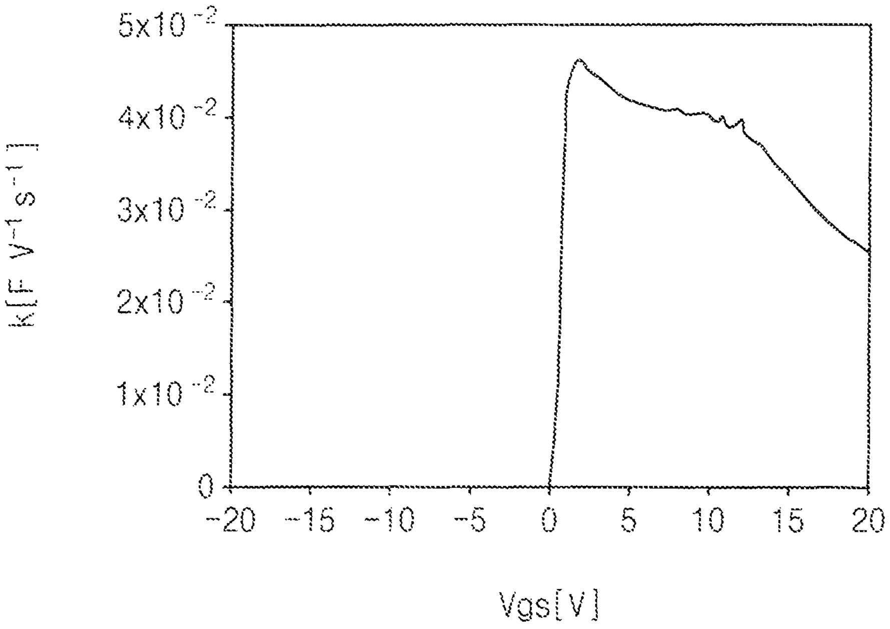
FIG. 8 is a diagram illustrating an embodiment of a k value according to a gate-source voltage of a driving transistor.
Figure 10:
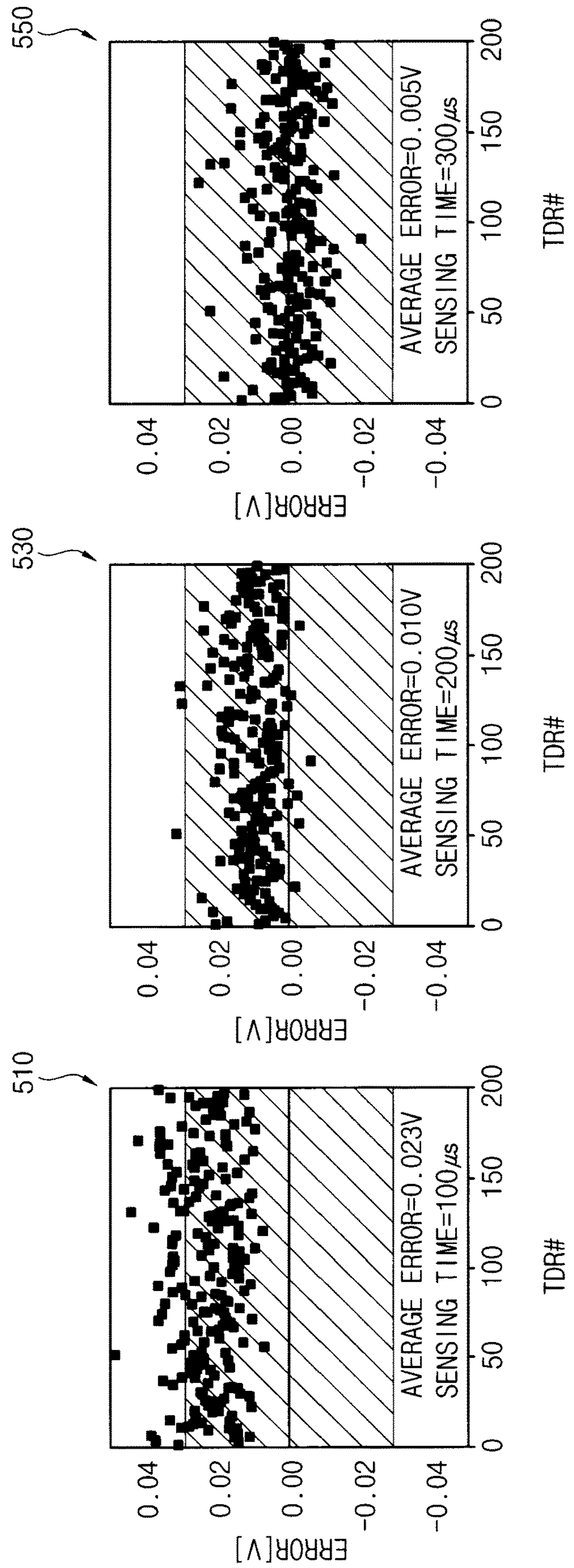
FIG. 10 is a diagram for describing embodiments of differences between predicted saturated source voltages and actual saturated source voltages according to sensing times in a method of sensing a driving characteristic.
Figure 11:
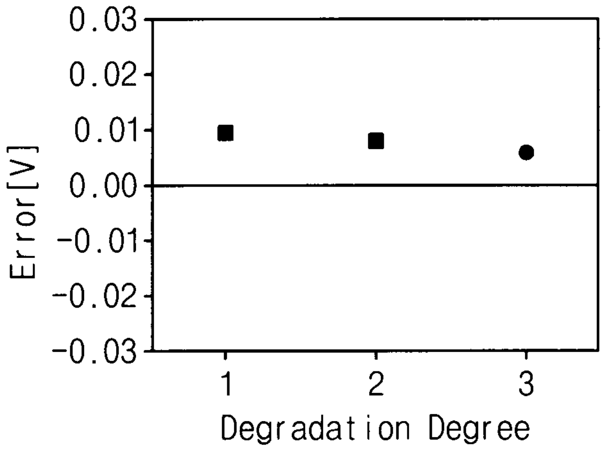
FIG. 11 is a diagram for describing embodiments of differences between predicted saturated source voltages and actual saturated source voltages according to degradation degrees in a method of sensing a driving characteristic.

FIG. 4 is a flowchart illustrating an embodiment of a method of sensing a driving characteristic in a display device, FIG. 5 is a diagram for describing an example where a pixel row on which a sensing operation is to be performed is selected in each frame period, FIG. 6 is a timing diagram for describing an embodiment of an operation of a display device, FIG. 7 is a diagram for describing an embodiment of equations used to predict a saturated source voltage in a method of sensing a driving characteristic, FIG. 8 is a diagram illustrating an embodiment of a k value according to a gate-source voltage of a driving transistor, FIG. 9 is a diagram for describing an embodiment of equations used to calculate a mobility parameter in a method of sensing a driving characteristic, FIG. 10 is a diagram for describing embodiments of differences between predicted saturated source voltages and actual saturated source voltages according to sensing times in a method of sensing a driving characteristic, and FIG. 11 is a diagram for describing embodiments of differences between predicted saturated source voltages and actual saturated source voltages according to degradation degrees in a method of sensing a driving characteristic.

Referring to FIGS. 1 through 4, in embodiments of a method of sensing a driving characteristic in a display device 100, a controller 160 may select a pixel row on which a sensing operation is to be performed from a plurality of pixel rows of a display panel 110 in each frame period (S210). In some embodiments, the plurality of pixel rows may be sequentially selected during a plurality of frame period. In an embodiment, as illustrated in FIG. 5, the display panel 110 may include N pixel rows PXR1, PXR2, . . . , PXRN, where N is an integer greater than 1, and the controller 160 may sequentially select first through N-th pixel rows PXR1, PXR2, . . . , PXRN in an order from the first pixel row PXR1 to the N-th pixel row PXRN during first through N-th frame period FP1, FP2, . . . , FPN, for example. Each frame period FP1, FP2, . . . , FPN and FPN+1 may include an active period AP in which the data enable signal DE periodically transitions and a vertical blank period VBP in which the data enable signal DE is fixed to a low level. A sensing circuit 140 may perform the sensing operation on the first pixel row PXR1 in a sensing time ST within the vertical blank period VBP of the first frame period FP1, may perform the sensing operation on the second pixel row PXR2 in the sensing time ST within the vertical blank period VBP of the second frame period FP2, and, in this manner, may perform the sensing operation on the N-th pixel row PXRN in the sensing time ST within the vertical blank period VBP of the N-th frame period FPN. Further, the controller 160 may select the first pixel row PXR1 again in an (N+1)-th frame period FPN+1, and the sensing circuit 140 may perform the sensing operation on the first pixel row PXR1 again in the sensing time ST within the vertical blank period VBP of the (N+1)-th frame period FPN+1. In other embodiments, the controller 160 may randomly select a pixel row on which the sensing operation is to be performed from the plurality of pixel rows of the display panel 110 in each frame period.

A gate voltage of a driving transistor TDR of each pixel PX in the selected pixel row may be fixed to a sensing data voltage VSD in the sensing time ST within the vertical blank period VBP (e.g., from a start time point of the sensing time ST to a second time point T2). The sensing circuit 140 may measure a first source voltage Vs(T1) of the driving transistor TDR at a first time point T1 of the sensing time ST (S220), and may measure a second source voltage Vs(T2) of the driving transistor TDR at the second time point T2 of the sensing time ST (S230).

In an embodiment, as illustrated in FIG. 6, the vertical blank period VBP may include the sensing time ST in which the sensing operation is performed on the selected pixel row, for example. At the start time point TS of the sensing time ST, a scan driver 120 may provide a scan signal SC having a high level to the selected pixel row, and the data driver 130 may apply the sensing data voltage VSD to a plurality of data lines DL. The sensing data voltage VSD may be any voltage higher than a reference voltage VREF. In an embodiment, the sensing data voltage VSD may be, but not be limited to a 255-gray voltage, a 128-gray voltage, or the like, for example. A first switching transistor TSW1 of each pixel PX in the selected pixel row may be turned on in response to the scan signal SC having the high level, and the first switching transistor TSW1 may transfer a voltage V_DL of the data line DL, or the sensing data voltage VSD to a gate of the driving transistor TDR and a first electrode of a storage capacitor CST. Accordingly, the driving transistor TDR may have a gate voltage corresponding to the sensing data voltage VSD. Further, the sensing circuit 140 may apply the reference voltage VREF to a plurality of sensing lines SL, and line capacitors CL of the plurality of sensing lines SL may be precharged to the reference voltage VREF. In some embodiments, the reference voltage VREF may be, but not be limited to, about 0 volt (V). In an embodiment, a first switch 141 of the sensing circuit 140 may be turned on in response to a reference signal SREF having a high level, and the reference voltage VREF may be applied to the sensing line SL through the first switch 141, for example.

After a predetermined time from the start time point TS of the sensing time ST, or at a third time point T3 before the first time point T1, the sensing circuit 140 may stop applying the reference voltage VREF to the plurality of sensing lines SL, and the scan driver 120 may provide a sensing signal SS having a high level to the selected pixel row. In an embodiment, the first switch 141 of the sensing circuit 140 may be turned off in response to the reference signal SREF having a low level, and the reference voltage VREF may not be applied to the sensing line SL, for example. Further, a second switching transistor TSW2 of each pixel PX in the selected pixel row may be turned on in response to the sensing signal SS having the high level, and the second switching transistor TSW2 may couple a source of the driving transistor TDR to the sensing line SL.

Since the voltage V_DL of the data line DL is the sensing data voltage VSD, and the scan signal SC has the high level, the gate voltage of the driving transistor TDR may be fixed to the sensing data voltage VSD. The driving transistor TDR may be turned on based on the sensing data voltage VSD, a drain-source current of the driving transistor TDR may flow through the second switching transistor TSW2 to the line capacitor CL of the sensing line SL, and a voltage of the sensing line SL may be gradually increased until the driving transistor TDR is turned off. Since the source of the driving transistor TDR is coupled to the sensing line SL, a source voltage Vs of the driving transistor TDR may be substantially the same as a voltage of the sensing line SL. Thus, the voltage of the sensing line SL, or the source voltage Vs of the driving transistor TDR may be gradually increased until the source voltage Vs is saturated to a saturated source voltage SVs corresponding to a voltage where a threshold voltage Vth of the driving transistor TDR is subtracted from the sensing data voltage VSD.

Before the source voltage Vs is saturated to the saturated source voltage SVs, the sensing circuit 140 may measure the first source voltage Vs(T1) of the driving transistor TDR at the first time point T1 by measuring the voltage of the sensing line SL at the first time point T1 of the sensing time ST, and may measure the second source voltage Vs(T2) of the driving transistor TDR at the second time point T2 by measuring the voltage of the sensing line SL at the second time point T2 of the sensing time ST. In some embodiments, a time from the start time point TS of the sensing time ST to the first time point T1 may be, but not be limited to, about 200 microseconds (μs), and a time from the first time point T1 to the second time point T2 may be, but not be limited to, about 10 μs. In an embodiment, a second switch 142 of the sensing circuit 140 may be turned on in response to a sampling signal SSAM having a high level at the first time point T1, an ADC 143 of the sensing circuit 140 may convert the voltage of the sensing line SL at the first time point T1 into a digital signal, and the controller 160 may receive the first source voltage Vs(T1) in the form of the digital signal from the sensing circuit 140, for example. Further, the second switch 142 of the sensing circuit 140 may be turned on in response to the sampling signal SSAM having the high level at the second time point T2, the ADC 143 of the sensing circuit 140 may convert the voltage of the sensing line SL at the second time point T2 into a digital signal, and the controller 160 may receive the second source voltage Vs(T2) in the form of the digital signal from the sensing circuit 140.

As described above, the data driver 130 may apply the sensing data voltage VSD to the plurality of data lines DL during the sensing time ST (e.g., from the start time point TS of the sensing time ST to an end time point TE of the sensing time), and the scan driver 120 may apply the scan signal SC to the selected pixel row during the sensing time ST (e.g., from the start time point TS of the sensing time ST to the end time point TE of the sensing time ST, or from the start time point TS of the sensing time ST to the second time point T2). Accordingly, the gate voltage of the driving transistor TDR may be fixed to the sensing data voltage VSD during the sensing time ST (e.g., from the start time point TS of the sensing time ST to the second time point T2). Further, the sensing circuit 140 may apply the reference voltage VREF to the plurality of sensing lines SL from the start time point TS of the sensing time ST to the third time point T3, and the scan driver 120 may apply the sensing signal SS to the selected pixel row from the third time point T3 to the end time point TE of the sensing time ST. Accordingly, the voltage of the sensing line SL, or the source voltage Vs of the driving transistor TDR may be gradually increased until the source voltage Vs is saturated to the saturated source voltage SVs corresponding to the voltage where the threshold voltage Vth of the driving transistor TDR is subtracted from the sensing data voltage VSD. The sensing circuit 140 may measure the first and second source voltages Vs(T1) and Vs(T2) of the driving transistor TDR respectively at the first and second time points T1 and T2 before the source voltage Vs is saturated to the saturated source voltage SVs.

In some embodiments, the vertical blank period VBP may further include an initialization time INIT in which the sensing line SL and/or the data line DL are initialized. In the initialization time INIT, the reference voltage VREF may be applied to the sensing line SL. In an embodiment, the first switch 141 of the sensing circuit 140 may be turned on in response to the reference signal SREF having the high level, and the reference voltage VREF may be applied to the sensing line SL through the first switch 141, for example. Further, in the initialization time INIT, the reference voltage VREF or another initialization voltage may be applied to the data line DL.

In some embodiments, the vertical blank period VBP may further include, after the sensing time ST or after the initialization time INIT, a previous data writing time PDWT in which a previous data voltage PVDAT applied to the pixel PX in the active period AP before the vertical blank period VBP is applied again to the pixel PX. In the previous data writing time PDWT, the scan driver 120 may apply the scan signal SC having the high level and the sensing signal SS having the high level to the selected pixel row on which the sensing operation is performed, the sensing circuit 140 may apply the reference voltage VREF to the plurality of sensing lines SL, and the data driver 130 may apply the previous data voltages PVDAT for the selected pixel row to the plurality of data lines DL. Accordingly, the previous data voltage PVDAT may be stored in each pixel PX of the selected pixel row in the previous data writing time PDWT, and the pixel PX may emit light based on the previous data voltage PVDAT in the next active period AP until the next data voltage VDAT is provided in the next active period AP.

The controller 160 may receive the first source voltage Vs(T1) and the second source voltage Vs(T2) from the sensing circuit 140, may calculate a threshold voltage parameter based on the first source voltage Vs(T1) (S240), may calculate a mobility parameter based on the first source voltage Vs(T1) and the second source voltage Vs(T2) (S250), may predict the saturated source voltage SVs of the driving transistor TDR based on the threshold voltage parameter and the mobility parameter (S260), and may calculate the threshold voltage Vth of the driving transistor TDR based on the saturated source voltage SVs (S270).

In some embodiments, as illustrated in FIG. 7, the threshold voltage parameter γ may be calculated by subtracting the reference voltage VREF (or Vs(0)) from the first source voltage Vs(T1). Further, in some embodiments, the reference voltage VREF (or Vs(0)) may be about 0V, and the threshold voltage parameter γ may be the first source voltage Vs(T1). Further, in some embodiments, as illustrated in FIG. 9, the mobility parameter β may be calculated by an equation:

$$\beta = \frac{Vs(T2) - Vs(T1)}{T2 - T1} \cdot \frac{1}{(Vg - Vs(T1) - Vth)^2} \cdot T1,$$

where, β may represent the mobility parameter, T1 may represent the first time point, T2 may represent the second time point, Vs(T1) may represent the first source voltage, Vs(T2) may represent the second source voltage, Vg may represent the sensing data voltage VSD, and Vth may represent the threshold voltage of the driving transistor TDR obtained by a previous sensing operation. Further, in some embodiments, as illustrated in FIG. 7, the saturated source voltage SVs may be predicted by an equation:

$$SVs = \frac{\gamma}{2} + \sqrt{\frac{\gamma^2}{4} + \frac{\gamma}{\beta}},$$

where, SVs may represent the saturated source voltage, γ may represent the threshold voltage parameter, and β may represent the mobility parameter. Further, in some embodiments, as illustrated in FIG. 7, the threshold voltage Vth of the driving transistor TDR may be calculated by subtracting the saturated source voltage SVs from the sensing data voltage VSD.

In an embodiment, as illustrated in FIG. 7, a drain-source current of the driving transistor TDR may be determined by an equation 310:

$$I_{ds}(t) = \frac{1}{2}\mu_n C_{ox}\frac{W}{L} \cdot (V_{gs}(t) - V_{th})^2,$$

where, Ids(t) may represent the drain-source current of the driving transistor TDR, may represent mobility of the driving transistor TDR, $C_{ox}$ may represent a capacitance per unit area of the driving transistor TDR, W may represent a channel width of the driving transistor TDR, L may represent a channel length of the driving transistor TDR, Vgs(t) may represent a gate-source voltage of the driving transistor TDR, and Vth may represent the threshold voltage of the driving transistor TDR, for example. When "Vgs(t)–Vth" is replaced with an effective voltage "Veff(t)", and $$\text{“}\frac{1}{2}\mu_n C_{ox}\frac{W}{L}\text{”}$$

is replaced with "k," the equation 310 may be simplified to an equation 320:

$$I_{ds}(t) = k \cdot V_{eff}(t)^2,$$

where, Veff(t) may represent the effective voltage, and k may represent a transconductance parameter of the driving transistor TDR.

An amount Q of charges stored in the line capacitor CL of the sensing line SL may be determined by an equation 330 "$Q=C_{line}\cdot V_s$". Here, Q may represent the amount of charges stored in the line capacitor CL, Cline may represent a capacitance of the line capacitor CL, and Vs may represent the source voltage of the driving transistor TDR. Since the gate voltage of the driving transistor TDR is fixed, "Veff(t)" may be "Vgs(t)–Vth=Vg–Vs(t)–Vth". Accordingly, when both sides of the equation 330 are differentiated with respect to time t, the equation 330 may become an equation 340:

$$\frac{dQ}{dt} = C_{line} \cdot \frac{dV_s(t)}{dt} = -C_{line} \cdot \frac{dV_{eff}(t)}{dt}.$$

Since the drain-source current of the driving transistor TDR is applied to the line capacitor CL, the equation 320 may be substantially equal to the equation 340, and thus an equation 350 may be extracted as below:

$$k \cdot V_{eff}(t)^2 = -C_{line} \cdot \frac{dV_{eff}(t)}{dt}$$

When a differential equation for "Veff(t)" is solved based on the equation 350, an equation 360 may be extracted as below:

$$V_{eff}(t) = \frac{1}{\frac{1}{V_g - V_s(0) - V_{th}} + \frac{k}{C_{line}}t}$$

Here, Vg may represent the gate voltage of the driving transistor TDR, or the sensing data voltage VSD, and Vs(0) may be the source voltage of the driving transistor TDR before being increased, or the source voltage of the driving transistor TDR at the start time point TS or at the third time point T3. Since "Veff(t)" is "Vgs(t)–Vth=Vg–Vs(t)–Vth", an equation 365 below may be extracted from the equation 360:

$$V_{eff}(t) = V_g - V_s(t) - V_{th} = \frac{1}{\frac{1}{V_g - V_s(0) - V_{th}} + \frac{k}{C_{line}}t}$$

When the equation 365 is modified with respect to "Vth", $$\text{“}\frac{k}{C_{line}}t\text{”}$$

is replaced with the mobility parameter β, and "Vs(t)–Vs(0)" is replaced with the threshold voltage parameter γ, an equation 370 may be extracted as below:

$$V_{th} = V_g - \left(\frac{2\gamma}{-\beta\gamma + \sqrt{\beta^2\gamma^2 + 4\beta\gamma}} + V_s(0)\right),$$

where, $$“\frac{2\gamma}{-\beta\gamma+\sqrt{\beta^2\gamma^2+4\beta\gamma}}+V_s(0)”$$

may be the saturated source voltage SVs of the driving transistor TDR. The source voltage of the driving transistor TDR before being increased, or the source voltage of the driving transistor TDR at the start time point TS or at the third time point T3 may be the reference voltage VREF. Thus, in a case where the reference voltage VREF is about 0V, the saturated source voltage SVs may be $$“\frac{2\gamma}{-\beta\gamma+\sqrt{\beta^2\gamma^2+4\beta\gamma}}”$$

as illustrated in an equation 380. When the equation 380 is modified, the saturated source voltage SVs may be $$“\frac{\gamma}{2}+\sqrt{\frac{\gamma^2}{4}+\frac{\gamma}{\beta}}”$$

as illustrated in an equation 390. Here, γ may represent the threshold voltage parameter, or Vs(t), and β may represent the mobility parameter $$“\frac{k}{C_{line}}t”.$$

As illustrated in FIG. 8, “k” (i.e., $$“\frac{1}{2}\mu_n C_{ox}\frac{W}{L}”)$$

may not be a constant, but a variable that is changed according to the gate-source voltage Vgs of the driving transistor TDR. Thus, “k” (e.g., the transconductance parameter of the driving transistor TDR) may be expressed as “k(Vgs(t))”. The mobility parameter β may be determined by “k(Vgs(t))”, and may be calculated as illustrated in FIG. 9.

As illustrated in FIG. 9, when an equation 410 of FIG. 9 (or the equation 330 of FIG. 7) is differentiated and approximated with respect to time t, an equation 420 may be extracted as below:

$$I_{ds}(t)\cdot\Delta t=C_{line}\cdot\Delta V_s$$

When an equation 425 (or the equation 320 of FIG. 7) “$I_{ds}=k(V_{gs}(t))\,(V_{gs}(t)-V_{th})^2$” is put into the equation 420, an equation 430 may be extracted as below:

$$k(V_{gs}(t))=C_{line}\cdot\frac{\Delta V_s}{\Delta t}\cdot\frac{1}{(V_{gs}(t)-V_{th})^2},$$

where, $\Delta V_s$ may represent a source voltage difference of the driving transistor TDR, and Δt may represent a time difference. When a difference between the first source voltage Vs(T1) and the second source voltage Vs(T2) is put into $\Delta V_s$, and a difference between the first time point T1 and the second time point T2 is put into Δt, since the gate voltage Vg of the driving transistor TDR is fixed, and the second time point T2 is substantially immediately after the first time point T1 (e.g., after about 10 μs from the first time point T1), an equation 440 may be extracted from the equation 430 as below:

$$k(V_{gs}(t))=C_{line}\cdot\frac{V_s(T2)-V_s(T1)}{T2-T1}\cdot\frac{1}{(V_g-V_s(T1)-V_{th})^2}$$

Further, since the mobility parameter β is determined by an equation 445

$$“\beta=\frac{k(v_{gs}(t))}{c_{line}}\cdot t”,$$

when the equation 440 is put into the equation 445, an equation 450 may be extracted as below:

$$\beta=\frac{V_s(T2)-V_s(T1)}{T2-T1}\cdot\frac{1}{(V_g-V_s(T1)-V_{th})^2}\cdot T1,$$

where, β may represent the mobility parameter, T1 may represent the first time point, T2 may represent the second time point, Vs(T1) may represent the first source voltage, Vs(T2) may represent the second source voltage, Vg may represent the gate voltage of the driving transistor TDR, or the sensing data voltage VSD, and Vth may represent the threshold voltage of the driving transistor TDR obtained by the previous sensing operation. In some embodiments, in calculating the mobility parameter β, the threshold voltage Vth of the driving transistor TDR of the pixel PX measured when the display device 100 is manufactured may be used in the sensing operation performed at the first time after the display device 100 is manufactured. When the display device 100 is manufactured, the threshold voltage Vth of the driving transistor TDR may be measured after the source voltage Vs is saturated to the saturated source voltage SVs. Further, in the subsequent sensing operation for the pixel PX, the threshold voltage Vth of the driving transistor TDR of the pixel PX obtained or calculated by directly previous sensing operation.

As described above, the mobility parameter β may be calculated by the equation 450 of FIG. 9:

$$\beta=\frac{V_s(T2)-V_s(T1)}{T2-T1}\cdot\frac{1}{(V_g-V_s(T1)-V_{th})^2}\cdot T1$$

Further, the threshold voltage parameter γ may be determined as the first source voltage Vs T1 by the equation 390 of FIG. 7. Based on the mobility parameter β and the threshold voltage parameter γ, the saturated source voltage SVs of the driving transistor TDR may be predicted by the equation 390 of FIG. 7:

$$SVs=\frac{\gamma}{2}+\sqrt{\frac{\gamma^2}{4}+\frac{Y}{\beta}}$$

Thus, the saturated source voltage SVs of the driving transistor TDR after saturation may be predicted by the first and second source voltages Vs(T1) and Vs(T2) of the driving transistor TDR before saturation. The saturated source voltage SVs predicted in the method of sensing the driving characteristic in embodiments may be substantially the same as or similar to an actual saturated source voltage. Further, the threshold voltage Vth of the driving transistor TDR may be calculated by the equation 370 of FIG. 7, or by subtracting the saturated source voltage SVs from the sensing data voltage VSD.

FIG. 10 illustrates a graph 510 that shows differences between the saturated source voltages predicted by the equation 390 of FIG. 7 and the actual saturated source voltages of the driving transistors TDR in a first case where the sensing time ST is about 100 μs, a graph 530 that shows differences between the predicted saturated source voltages and the actual saturated source voltages of the driving transistors TDR in a second case where the sensing time ST is about 200 μs, and a graph 550 that shows differences between the predicted saturated source voltages and the actual saturated source voltages of the driving transistors TDR in a third case where the sensing time ST is about 300 μs. As illustrated in FIG. 10, an average difference (or an average error) between the predicted saturated source voltages and the actual saturated source voltages in the first case where the sensing time ST may be about 100 μs is about 0.023V, the average error in the second case where the sensing time ST is about 200 μs may be about 0.010V, and the average error in the third case where the sensing time ST is about 300 μs may be about 0.005V. Further, as illustrated in FIG. 10, in the second case where the sensing time ST is about 200 μs, the differences (or errors) between the predicted saturated source voltages and the actual saturated source voltages may be less than an acceptable or tolerable error. Accordingly, in some embodiments, the sensing time ST may be, but not be limited to, about 200 μs or about 210 μs.

Further, FIG. 11 illustrates an embodiment of differences between the saturated source voltages predicted by the equation 390 of FIG. 7 and the actual saturated source voltages according to degradation degrees. In the embodiment of FIG. 11, as illustrated in a table 610, a degradation degree of 1 may represent that the driving transistor TDR (refer to FIG. 2) is not degraded, a degradation degree of 2 may represent that the driving transistor TDR is degraded such that the threshold voltage Vth is increased by about 0.4V and the mobility p is decreased by about 9.11% compared with the degradation degree of 1, and a degradation degree of 3 may represent that the driving transistor TDR is degraded such that the threshold voltage Vth is increased by about 0.8V and the mobility p is decreased by about 18.15% compared with the degradation degree of 1. As illustrated in a graph 630 of FIG. 11, in all of the degradation degree of 1, the degradation degree of 2 and the degradation degree of 3, the differences (or errors) between the predicted saturated source voltages and the actual saturated source voltages may be less than or equal to about 0.01V. Thus, the saturated source voltages predicted in the method of sensing the driving characteristic in embodiments may be substantially the same as the actual saturated source voltages.

As described above, in embodiments of the method of sensing the driving characteristic, the first and second source voltages Vs(T1) and Vs(T2) (refer to FIGS. 3 and 6) of the driving transistor TDR of each pixel PX in the selected pixel row may be measured respectively at the first and second time points T1 and T2 (refer to FIGS. 3 and 6) of the sensing time ST (refer to FIG. 6) within the vertical blank period VBP (refer to FIG. 6), the threshold voltage parameter γ and the mobility parameter β may be calculated based on the first and second source voltages Vs(T1) and Vs(T2), the saturated source voltage SVs (refer to FIG. 3) of the driving transistor TDR may be predicted based on the threshold voltage parameter γ and the mobility parameter β, and the threshold voltage Vth of the driving transistor TDR may be calculated based on the saturated source voltage SVs. Accordingly, since the saturated source voltage SVs of the driving transistor TDR after saturation is predicted by the first and second source voltages Vs(T1) and Vs(T2) of the driving transistor TDR before saturation, the sensing operation that senses the driving characteristic (e.g., the threshold voltage Vth and/or mobility) of the driving transistor TDR may be accurately and efficiently performed in real time.

Figure 12:
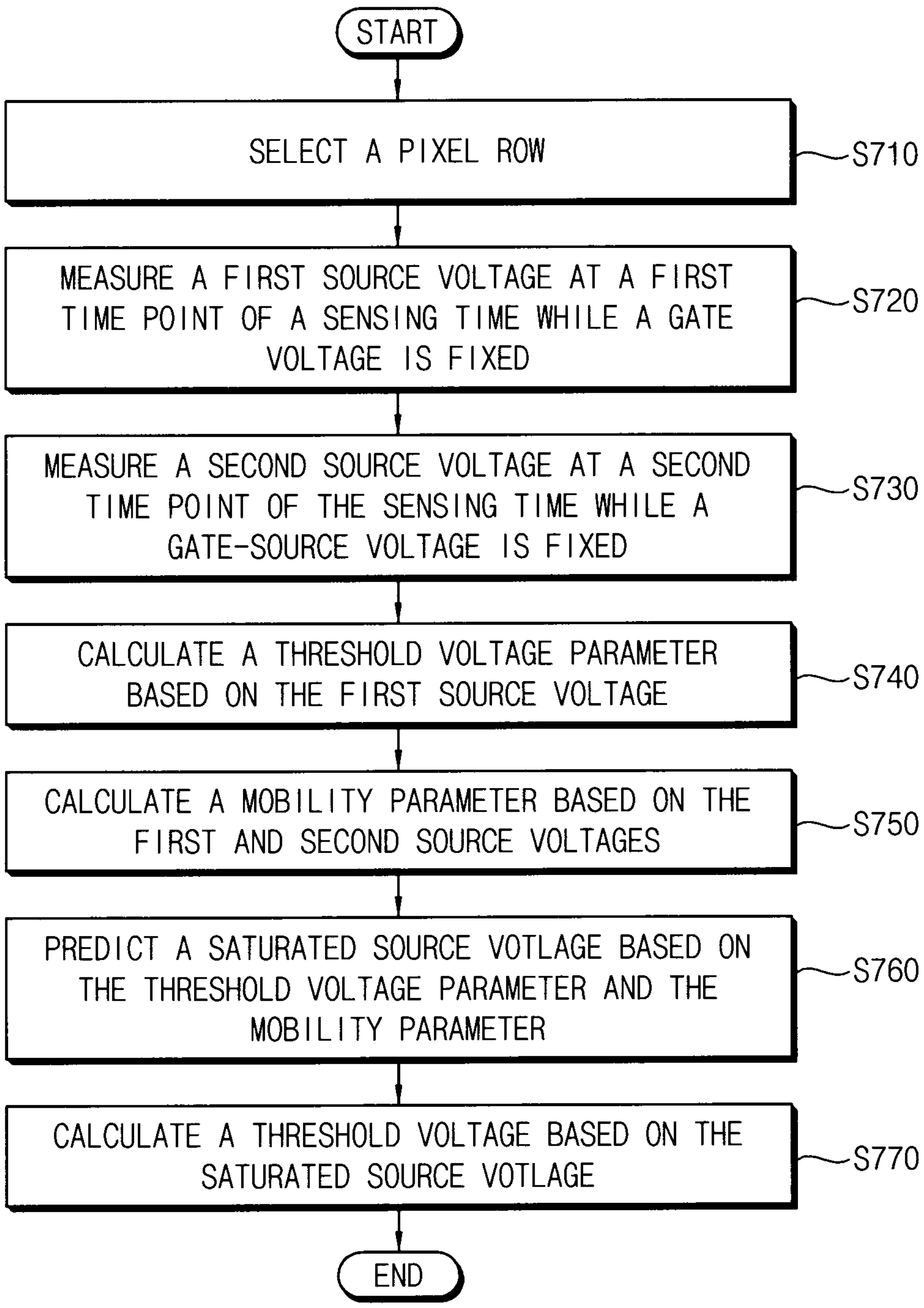
FIG. 12 is a flowchart illustrating a method of sensing a driving characteristic in a display device.
Figure 13:
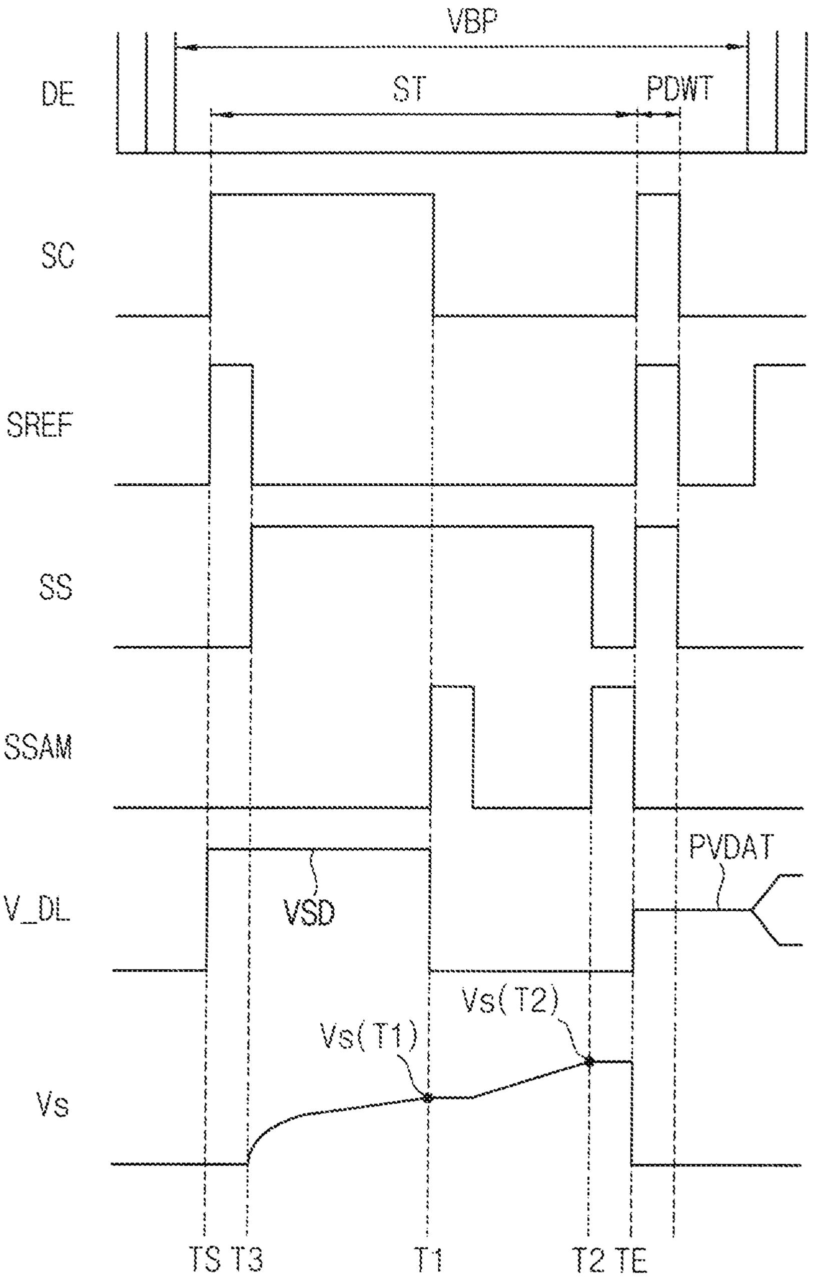
FIG. 13 is a timing diagram for describing an embodiment of an operation of a display device.

FIG. 12 is a flowchart illustrating an embodiment of a method of sensing a driving characteristic in a display device, FIG. 13 is a timing diagram for describing an embodiment of an operation of a display device, and FIG. 14 is a diagram for describing an embodiment of equations used to calculate a mobility parameter in a method of sensing a driving characteristic.

The method of FIG. 12 may be similar to a method of FIG. 4, except that not a gate voltage of a driving transistor, but a gate-source voltage of the driving transistor may be fixed from a first time point of a sensing time to a second time point of the sensing time.

Referring to FIGS. 1 through 3, and 12 through 14, in embodiments of a method of sensing a driving characteristic in a display device 100, a controller 160 may select a pixel row on which a sensing operation is to be performed from a plurality of pixel rows of a display panel 110 in each frame period (S710). A gate voltage of a driving transistor TDR of each pixel PX in the selected pixel row may be fixed to a sensing data voltage VSD from a start time point TS (refer to FIG. 6) of a sensing time ST (refer to FIG. 6) within a vertical blank period VBP (refer to FIG. 6) to a first time point T1, and a sensing circuit 140 may measure a first source voltage Vs(T1) of the driving transistor TDR at the first time point T1 of the sensing time ST (S720). A gate-source voltage of the driving transistor TDR may be fixed from the first time point T1 to a second time point T2 by floating the gate of the driving transistor TDR, and the sensing circuit 140 and may measure a second source voltage Vs(T2) of the driving transistor TDR at the second time point T2 of the sensing time ST (S730).

In an embodiment, as illustrated in FIG. 13, a data driver 130 may apply the sensing data voltage VSD to a plurality of data lines from the start time point TS of the sensing time ST to the first time point T1, and a scan driver 120 may apply a scan signal SC to the selected pixel row from the start time point TS of the sensing time ST to the first time point T1, for example. Thus, the gate voltage of the driving transistor TDR may be fixed to the sensing data voltage VSD from the start time point TS of the sensing time ST to the first time point T1. Further, the sensing circuit 140 may apply a reference voltage VREF to a plurality of sensing lines SL from the start time point TS of the sensing time ST to a third time point T3 before the first time point T1, and line capacitors CL of the plurality of sensing lines SL may be precharged to the reference voltage VREF. After the third time point T3, a voltage of the sensing line SL, or a source voltage Vs of the driving transistor TDR may be gradually increased until the source voltage Vs is saturated to a saturated source voltage SVs corresponding to a voltage where a threshold voltage Vth of the driving transistor TDR is subtracted from the sensing data voltage VSD. Before the source voltage Vs is saturated to the saturated source voltage SVs, the sensing circuit 140 may measure the first source voltage Vs(T1) of the driving transistor TDR at the first time point T1 by measuring the voltage of the sensing line SL at the first time point T1 of the sensing time ST.

At the first time point T1 of the sensing time ST, the scan driver 120 may change the scan signal SC to a low level. Thus, the gate-source voltage of the driving transistor TDR may be fixed by floating the gate of the driving transistor TDR from the first time point T1 to the second time point T2 (or to an end time point TE of the sensing time ST). The sensing circuit 140 may measure the second source voltage Vs(T2) of the driving transistor TDR at the second time point T2 by measuring the voltage of the sensing line SL at the second time point T2 of the sensing time ST.

In some embodiments, the vertical blank period VBP may further include, after the sensing time ST, a previous data writing time PDWT in which a previous data voltage PVDAT applied to the pixel PX in an active period AP before the vertical blank period VBP is applied again to the pixel PX. In some embodiments, the vertical blank period VBP may further include an initialization time INIT between the sensing time ST and the previous data writing time PDWT as illustrated in FIG. 6.

The controller 160 may receive the first source voltage Vs(T1) and the second source voltage Vs(T2) from the sensing circuit 140, may calculate a threshold voltage parameter based on the first source voltage Vs(T1) (S740), may calculate a mobility parameter based on the first source voltage Vs(T1) and the second source voltage Vs(T2) (S750), may predict the saturated source voltage SVs based on the threshold voltage parameter and the mobility parameter (S760), and may calculate the threshold voltage Vth of the driving transistor TDR based on the saturated source voltage SVs (S770).

In some embodiments, as illustrated in FIG. 14, when a difference between the first source voltage Vs(T1) and the second source voltage Vs(T2) is put into $\Delta V_s$, and a difference between the first time point T1 and the second time point T2 is put into Δt, since the gate-source voltage Vgs(t) of the driving transistor TDR is fixed from the first time point T1 to the second time point T2, an equation 820 extracted from an equation 810 (or an equation 430 of FIG. 9) as below:

$$k(V_{gs}(t)) = C_{line} \cdot \frac{V_s(T2) - V_s(T1)}{T2 - T1} \cdot \frac{1}{(V_{gs}(T1) - V_{th})^2}$$

Further, since the mobility parameter β is determined by an equation 830

$$\text{“}\beta = \frac{k(v_{gs}(t))}{c_{line}} \cdot t\text{”},$$

when the equation 820 is put into the equation 830, an equation 840 may be extracted as below:

$$\beta = \frac{V_s(T2) - V_s(T1)}{T2 - T1} \cdot \frac{1}{(V_{gs}(T1) - V_{th})^2} \cdot T1,$$

where, β may represent the mobility parameter, T1 may represent the first time point, T2 may represent the second time point, Vs(T1) may represent the first source voltage, Vs(T2) may represent the second source voltage, Vgs(T1) may represent the gate-source voltage of the driving transistor TDR at the first time point, and Vth may represent the threshold voltage of the driving transistor TDR obtained by a previous sensing operation.

Thus, the mobility parameter β may be calculated by the equation 840 of FIG. 14:

$$\beta = \frac{V_s(T2) - V_s(T1)}{T2 - T1} \cdot \frac{1}{(V_{gs}(T1) - V_{th})^2} \cdot T1$$

Further, the threshold voltage parameter γ may be determined as the first source voltage Vs(T1) by an equation 390 of FIG. 7. Based on the mobility parameter β and the threshold voltage parameter γ, the saturated source voltage SVs of the driving transistor TDR may be predicted by an equation 390 of FIG. 7:

$$SVs = \frac{\gamma}{2} + \sqrt{\frac{\gamma^2}{4} + \frac{\gamma}{\beta}}$$

Thus, the saturated source voltage SVs of the driving transistor TDR after saturation may be predicted by the first and second source voltages Vs(T1) and Vs(T2) of the driving transistor TDR before saturation. Further, the threshold voltage Vth of the driving transistor TDR may be calculated by an equation 370 of FIG. 7, or by subtracting the saturated source voltage SVs from the sensing data voltage VSD.

As described above, in embodiments of the method of sensing the driving characteristic, the first and second source voltages Vs(T1) and Vs(T2) of the driving transistor TDR of each pixel PX in the selected pixel row may be measured respectively at the first and second time points T1 and T2 of the sensing time ST within the vertical blank period VBP, the threshold voltage parameter γ and the mobility parameter β may be calculated based on the first and second source voltages Vs(T1) and Vs(T2), the saturated source voltage SVs of the driving transistor TDR may be predicted based on the threshold voltage parameter γ and the mobility parameter β, and the threshold voltage Vth of the driving transistor TDR may be calculated based on the saturated source voltage SVs. Accordingly, since the saturated source voltage SVs of the driving transistor TDR after saturation is predicted by the first and second source voltages Vs(T1) and Vs(T2) of the driving transistor TDR before saturation, the sensing operation that senses the driving characteristic (e.g., the threshold voltage Vth and/or mobility) of the driving transistor TDR may be accurately and efficiently performed in real time.

Figure 15:
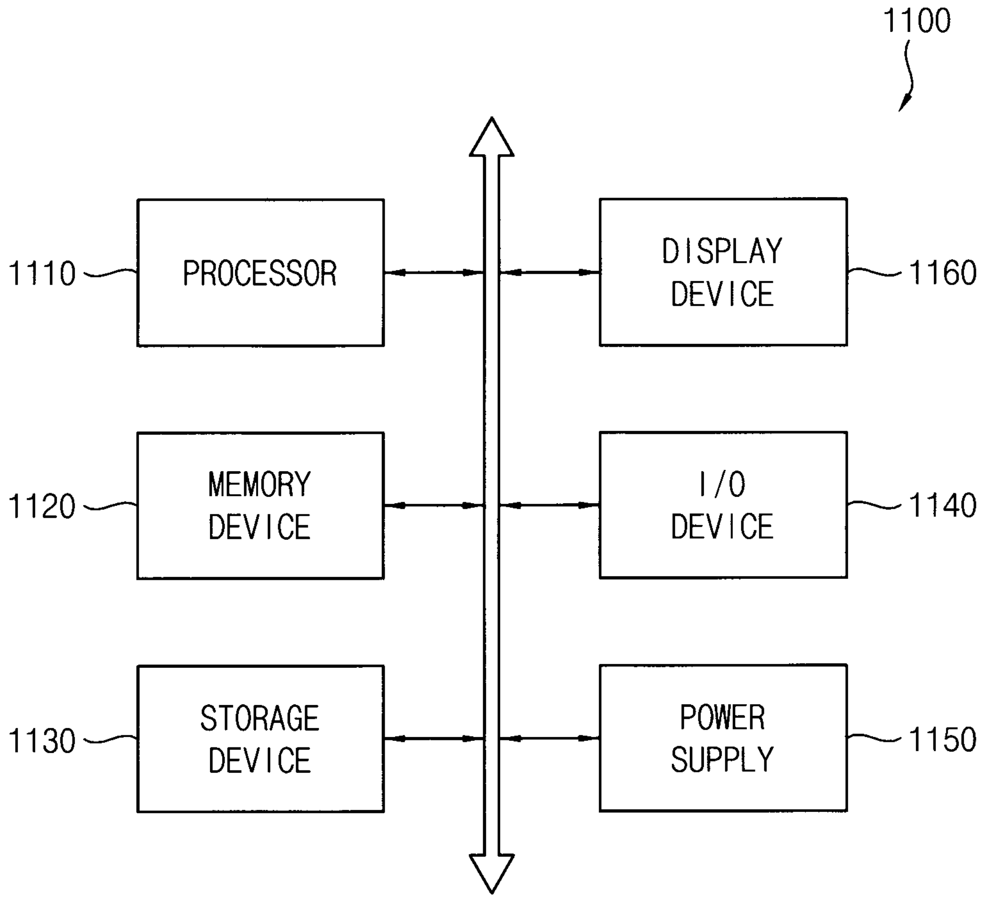
FIG. 15 is a block diagram illustrating an electronic device including a display device.

FIG. 15 is a block diagram illustrating an embodiment of an electronic device including a display device.

Referring to FIG. 15, an electronic device 1100 may include a processor 1110, a memory device 1120, a storage device 1130, an input/output ("I/O") device 1140, a power supply 1150, and a display device 1160. The electronic device 1100 may further include a plurality of ports for communicating a video card, a sound card, a memory card, a universal serial bus ("USB") device, other electric devices, etc.

The processor 1110 may perform various computing functions or tasks. In an embodiment, the processor 1110 may be an application processor ("AP"), a microprocessor, a central processing unit ("CPU"), etc., for example. In an embodiment, the processor 1110 may be coupled to other components via an address bus, a control bus, a data bus, etc., for example. Further, in some embodiments, the processor 1110 may be further coupled to an extended bus such as a peripheral component interconnection ("PCI") bus.

The memory device 1120 may store data for operations of the electronic device 1100. In an embodiment, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile dynamic random access memory (mobile "DRAM") device, etc.

In an embodiment, the storage device 1130 may be a solid state drive ("SSD") device, a hard disk drive ("HDD") device, a CD-ROM device, etc., for example. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, first and second source voltages of a driving transistor of each pixel in a selected pixel row may be measured at first and second time points of a sensing time within a vertical blank period, a threshold voltage parameter and a mobility parameter may be calculated based on the first and second source voltages, a saturated source voltage of the driving transistor may be predicted based on the threshold voltage parameter and the mobility parameter, and a threshold voltage of the driving transistor may be calculated based on the saturated source voltage. Accordingly, since the saturated source voltage of the driving transistor after saturation is predicted by the first and second source voltages of the driving transistor before saturation, a sensing operation that senses the driving characteristic (e.g., the threshold voltage and/or mobility) of the driving transistor may be accurately and efficiently performed.

Embodiments of the inventions may be applied any electronic device 1100 including the display device 1160. In an embodiment, the inventions may be applied to a television ("TV"), a digital TV, a 3D TV, a smart phone, a wearable electronic device, a tablet computer, a mobile phone, a personal computer ("PC"), a home appliance, a laptop computer, a personal digital assistant ("PDA"), a portable multimedia player ("PMP"), a digital camera, a music player, a portable game console, a navigation device, etc., for example.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the invention. Accordingly, all such modifications are intended to be included within the scope of the invention as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display driver for driving a display panel, the display driver comprising: a data driver coupled to a data line of the display panel; a sensing circuit coupled to a sensing line of the display panel; and a controller which controls the data driver and the sensing circuit, wherein a vertical blank period of a frame period includes a sensing time, wherein the sensing circuit measures a first source voltage of a driving transistor of a pixel included in the display panel at a first time point of the sensing time, and measures a second source voltage of the driving transistor at a second time point of the sensing time, and wherein the controller corrects input image data for the pixel based on a predicted saturated source voltage of the driving transistor corresponding to the first and second source voltages.

2. The display driver of claim 1, wherein the controller obtains a characteristic parameter based on the first source voltage and the second source voltage, predicts the saturated source voltage of the driving transistor based on the characteristic parameter, and obtains a threshold voltage of the driving transistor based on the saturated source voltage.

3. The display driver of claim 1, wherein the controller obtains a threshold voltage parameter by subtracting a reference voltage from the first source voltage.

4. The display driver of claim 1, wherein a gate voltage of the driving transistor is fixed to a sensing data voltage from a start time point of the sensing time to the second time point.

5. The display driver of claim 1, further comprising:

a scan driver which provides a scan signal and a sensing signal to the pixel, wherein the data driver applies a sensing data voltage to the data line during the sensing time, wherein the scan driver applies the scan signal to the pixel during the sensing time, wherein the sensing circuit applies a reference voltage to the sensing line from a start time point of the sensing time to a third time point before the first time point, and wherein the scan driver applies the sensing signal to the pixel from the third time point to an end time point of the sensing time.

6. The display driver of claim 1, wherein the controller obtains a mobility parameter, and wherein the mobility parameter is calculated by an equation:

$$\beta = \frac{Vs(T2) - Vs(T1)}{T2 - T1} \cdot \frac{1}{(Vg - Vs(T1) - Vth)^2} \cdot T1,$$

where β represents the mobility parameter, T1 represents the first time point, T2 represents the second time point, Vs(T1) represents the first source voltage, Vs(T2) represents the second source voltage, Vg represents a sensing data voltage, and Vth represents a threshold voltage of the driving transistor obtained by a previous sensing operation.

7. The display driver of claim 1, wherein the saturated source voltage is predicted by an equation:

$$SVs = \frac{\gamma}{2} + \sqrt{\frac{\gamma^2}{4} + \frac{\gamma}{\beta}},$$

where SVs represents the saturated source voltage, $\gamma$ represents a threshold voltage parameter, and $\beta$ represents a mobility parameter.

8. The display driver of claim 1, wherein a threshold voltage of the driving transistor is obtained by subtracting the saturated source voltage from a sensing data voltage.

9. The display driver of claim 1, wherein a time from a start time point of the sensing time to the first time point is about 200 microseconds, and wherein a time from the first time point to the second time point is about 10 microseconds.

10. The display driver of claim 1, wherein a gate voltage of the driving transistor is fixed to a sensing data voltage from a start time point of the sensing time to the first time point, and is floated from the first time point to the second time point, and wherein a gate-source voltage of the driving transistor is fixed from the first time point to the second time point.

11. The display driver of claim 1, further comprising:

a scan driver which provides a scan signal and a sensing signal to the pixel, wherein the data driver applies a sensing data voltage to the data line from a start time point of the sensing time to the first time point, wherein the scan driver applies the scan signal to the pixel from the start time point of the sensing time to the first time point, wherein the sensing circuit applies a reference voltage to the sensing line from the start time point of the sensing time to a third time point before the first time point, and wherein the scan driver applies the sensing signal to the pixel from the third time point to the second time point.

12. The display driver of claim 1, wherein the controller obtains a mobility parameter, and wherein the mobility parameter is calculated by an equation:

$$\beta = \frac{Vs(T2) - Vs(T1)}{T2 - T1} \cdot \frac{1}{(Vgs(T1) - Vth)^2} \cdot T1,$$

where $\beta$ represents the mobility parameter, T1 represents the first time point, T2 represents the second time point, Vs(T1) represents the first source voltage, Vs(T2) represents the second source voltage, Vgs(T1) represents a gate-source voltage of the driving transistor at the first time point, and Vth represents a threshold voltage of the driving transistor obtained by a previous sensing operation.

13. The display driver of claim 1, wherein the vertical blank period includes, after the sensing time, a previous data writing time in which a previous data voltage applied to the pixel in an active period before the vertical blank period is applied again to the pixel.

14. The display driver of claim 1, further comprising:

a characteristic parameter memory which stores a threshold voltage of the driving transistor and a characteristic parameter, wherein the controller corrects the input image data for the pixel based on the threshold voltage and the characteristic parameter stored in the characteristic parameter memory.

15. A method of operating a display driver for driving a display panel, the method comprising: measuring a first source voltage of a driving transistor of a pixel included in the display panel at a first time point of a sensing time within a vertical blank period of a frame period; measuring a second source voltage of the driving transistor at a second time point of the sensing time; and correcting input image data for the pixel based on a predicted saturated source voltage of the driving transistor corresponding to the first and second source voltages.

16. The method of claim 15, wherein correcting the input image data for the pixel includes:

obtaining a characteristic parameter based on the first source voltage and the second source voltage;

predicting the saturated source voltage of the driving transistor based on the characteristic parameter;

obtaining a threshold voltage of the driving transistor based on the saturated source voltage; and correcting the input image data for the pixel based on the threshold voltage of the driving transistor.

17. The method of claim 15, wherein a gate voltage of the driving transistor is fixed to a sensing data voltage from a start time point of the sensing time to the second time point.

18. The method of claim 15, wherein a mobility parameter is calculated by an equation:

$$\beta = \frac{Vs(T2) - Vs(T1)}{T2 - T1} \cdot \frac{1}{(Vg - Vs(T1) - Vth)^2} \cdot T1,$$

where $\beta$ represents the mobility parameter, T1 represents the first time point, T2 represents the second time point, Vs(T1) represents the first source voltage, Vs(T2) represents the second source voltage, Vg represents a sensing data voltage, and Vth represents a threshold voltage of the driving transistor obtained by a previous sensing operation.

19. The method of claim 15, wherein the saturated source voltage is predicted by an equation:

$$SVs = \frac{\gamma}{2} + \sqrt{\frac{\gamma^2}{4} + \frac{\gamma}{\beta}},$$

where SVs represents the saturated source voltage, $\gamma$ represents a threshold voltage parameter, and $\beta$ represents a mobility parameter.

20. The method of claim 15, wherein a gate voltage of the driving transistor is fixed to a sensing data voltage from a start time point of the sensing time to the first time point, and is floated from the first time point to the second time point, and wherein a gate-source voltage of the driving transistor is fixed from the first time point to the second time point.

21. The method of claim 15, wherein a mobility parameter is calculated by an equation:

$$\beta = \frac{Vs(T2) - Vs(T1)}{T2 - T1} \cdot \frac{1}{(Vgs(T1) - Vth)^2} \cdot T1,$$

where β represents the mobility parameter, T1 represents the first time point, T2 represents the second time point, Vs(T1) represents the first source voltage, Vs(T2) represents the second source voltage, Vgs(T1) represents a gate-source voltage of the driving transistor at the first time point, and Vth represents a threshold voltage of the driving transistor obtained by a previous sensing operation.

22. A display device comprising: a display panel including a data line, a sensing line, and a pixel coupled to the data line and the sensing line; a scan driver which provides a scan signal and a sensing signal to the pixel; a data driver coupled to the data line; a sensing circuit coupled to the sensing line; and a controller which controls the scan driver, the data driver and the sensing circuit, wherein a vertical blank period of a frame period includes a sensing time, wherein the sensing circuit measures a first source voltage of a driving transistor of the pixel at a first time point of the sensing time, and measures a second source voltage of the driving transistor at a second time point of the sensing time, and wherein the controller corrects input image data for the pixel based on a predicted saturated source voltage of the driving transistor corresponding to the first and second source voltages.

23. The display device of claim 22, wherein the controller obtains a characteristic parameter based on the first source voltage and the second source voltage, predicts the saturated source voltage of the driving transistor based on the characteristic parameter, and calculates a threshold voltage of the driving transistor based on the saturated source voltage.

24. The display device of claim 22, wherein the pixel includes:

the driving transistor including a gate, a drain receiving a first power supply voltage, and a source;

a first switching transistor including a gate receiving the scan signal, a drain coupled to the data line, and a source coupled to the gate of the driving transistor;

a second switching transistor including a gate receiving the sensing signal, a drain coupled to the source of the driving transistor, and a source coupled to the sensing line;

a storage capacitor including a first electrode coupled to the gate of the driving transistor, and a second electrode coupled to the source of the driving transistor; and a light emitting element including an anode coupled to the source of the driving transistor, and a cathode receiving a second power supply voltage.

25. An electronic device comprising: a processor configured to control an operation of the electronic device; and a display device comprising: a display panel including a data line, a sensing line, and a pixel coupled to the data line and the sensing line; a scan driver which provides a scan signal and a sensing signal to the pixel; a data driver coupled to the data line; a sensing circuit coupled to the sensing line; and a controller which controls the scan driver, the data driver and the sensing circuit, wherein a vertical blank period of a frame period includes a sensing time, wherein the sensing circuit measures a first source voltage of a driving transistor of the pixel at a first time point of the sensing time, and measures a second source voltage of the driving transistor at a second time point of the sensing time, and wherein the controller corrects input image data for the pixel based on a predicted saturated source voltage of the driving transistor corresponding to the first and second source voltages.

26. The display device of claim 25, wherein the controller obtains a characteristic parameter based on the first source voltage and the second source voltage, predicts the saturated source voltage of the driving transistor based on the characteristic parameter, and calculates a threshold voltage of the driving transistor based on the saturated source voltage.

* * * * *